United States Patent [19]
Vervoordeldonk

[11] Patent Number: 5,532,565
[45] Date of Patent: Jul. 2, 1996

[54] CONTROLLER

[75] Inventor: Michaël J. Vervoordeldonk, Eindhoven, Netherlands

[73] Assignee: U.S. Philips Corporation, New York, N.Y.

[21] Appl. No.: 420,895

[22] Filed: Apr. 11, 1995

Related U.S. Application Data

[63] Continuation of Ser. No. 164,226, Dec. 7, 1993, abandoned.

[30] Foreign Application Priority Data

Dec. 7, 1992 [EP] European Pat. Off. ............. 92203795

[51] Int. Cl.$^6$ ........................... G05B 13/00; G05B 13/04
[52] U.S. Cl. ..................... 318/610; 318/560; 318/609; 318/618; 364/149; 364/150
[58] Field of Search .................................. 318/560–646; 364/140–193

[56] References Cited

U.S. PATENT DOCUMENTS

| | | | |
|---|---|---|---|
| 4,195,337 | 3/1980 | Bertrand et al. | 364/106 |
| 4,539,633 | 9/1985 | Shigemasa et al. | 364/162 |
| 4,663,703 | 5/1987 | Axelby et al. | 364/149 |
| 4,679,136 | 7/1987 | Shigemasa | 364/150 |
| 4,719,561 | 1/1988 | Shigemasa | 364/148 |
| 4,725,942 | 2/1988 | Osuka | 364/150 |
| 4,862,054 | 8/1989 | Schauder | 318/800 |
| 5,268,625 | 12/1993 | Plummer | 318/610 |

FOREIGN PATENT DOCUMENTS 0196417 10/1986 European Pat. Off. .

OTHER PUBLICATIONS

"Basics of Motion Control", Machine Design, Jun. 1992, vol. 64. No. 12, pp. 9, 10, 16, 18, 22, 27, 28, 32, 47, 48.

*Primary Examiner*—Paul Ip
*Attorney, Agent, or Firm*—Edward Blocker

[57] ABSTRACT

A controller for controlling a non-linear mechanical system having a plurality of degrees of freedom, comprises compensation means to compensate the non-linear behavior of the mechanical system, the controller further comprises a reference model of both a control unit and the linearized mechanical system, and the controller further comprises adaptation means which adapts the compensation means in dependence on a difference between an output signal of the mechanical system and an output signal of the reference model.

7 Claims, 21 Drawing Sheets

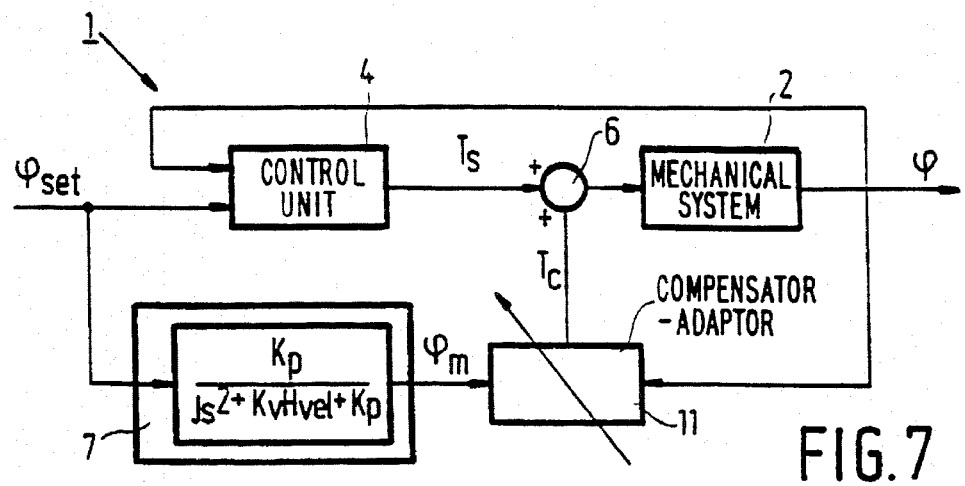
FIG. 7
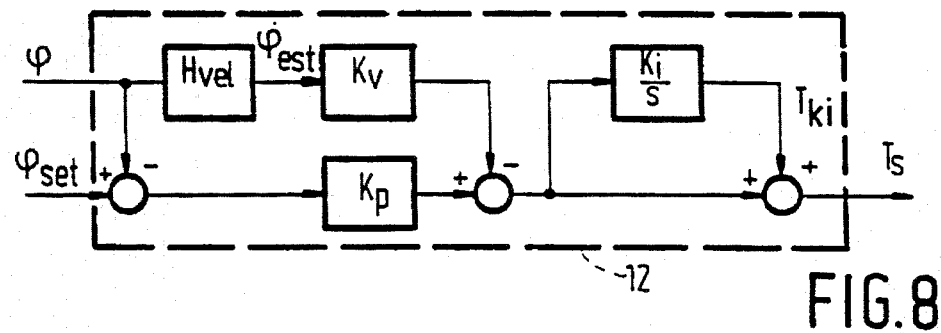
FIG. 8
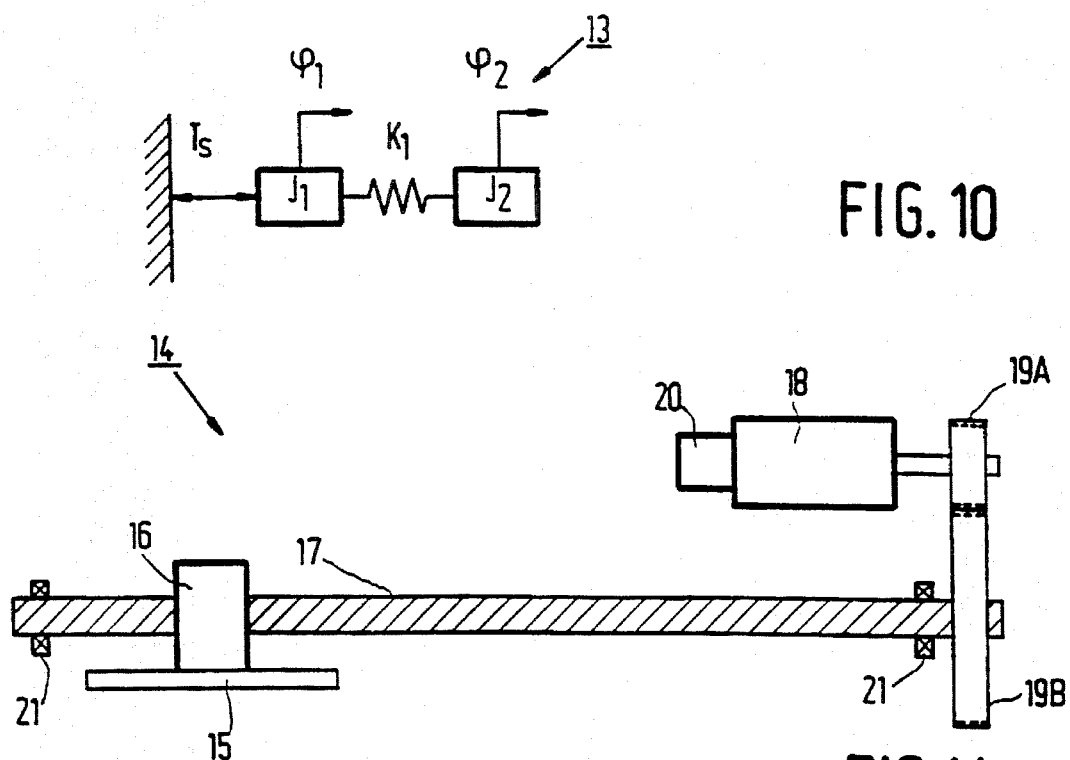
FIG. 10
FIG. 14

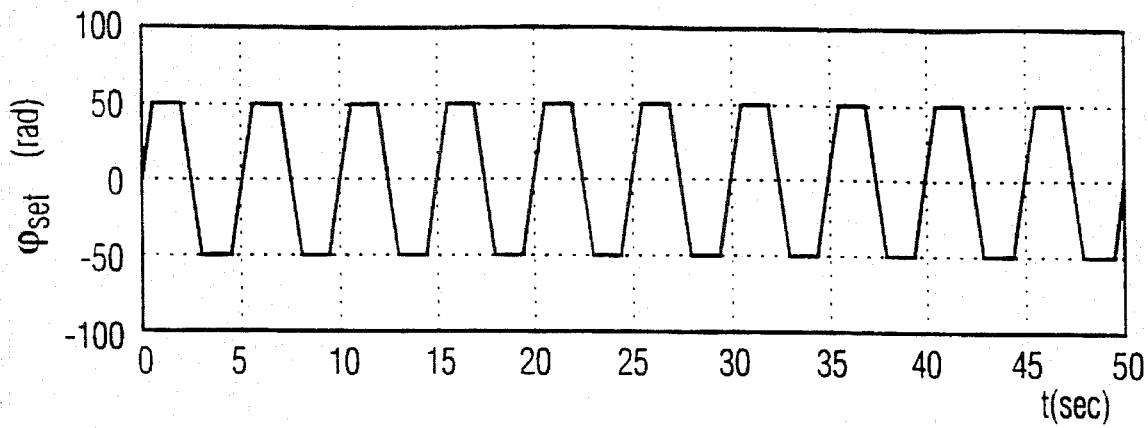
FIG. 9A(1)
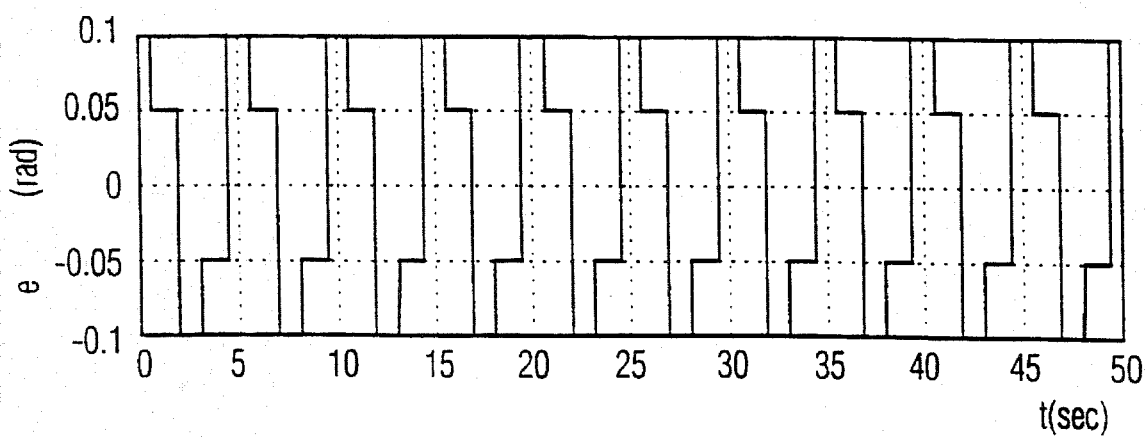
FIG. 9A(2)

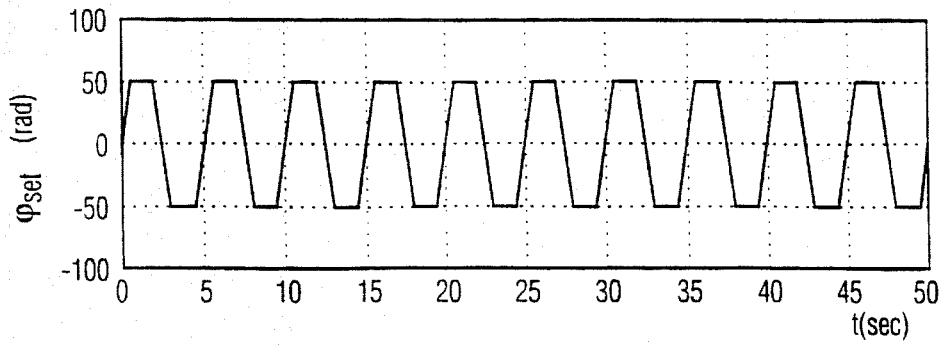
FIG. 9B(1)
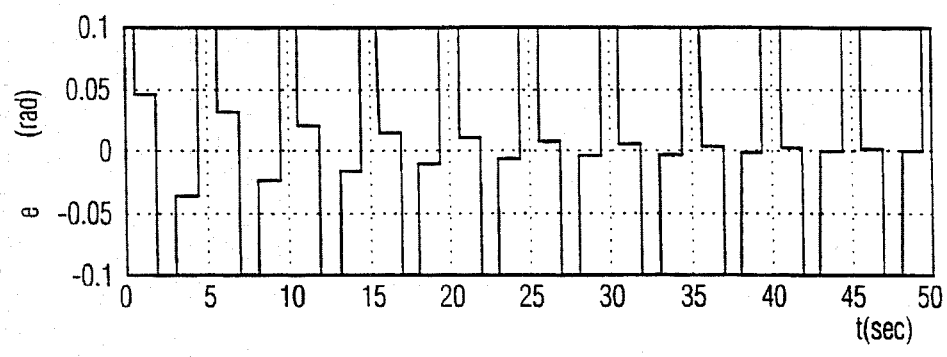
FIG. 9B(2)
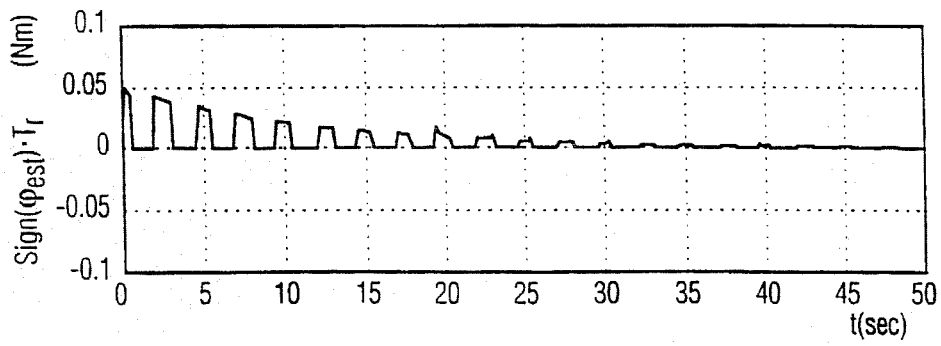
FIG. 9B(3)
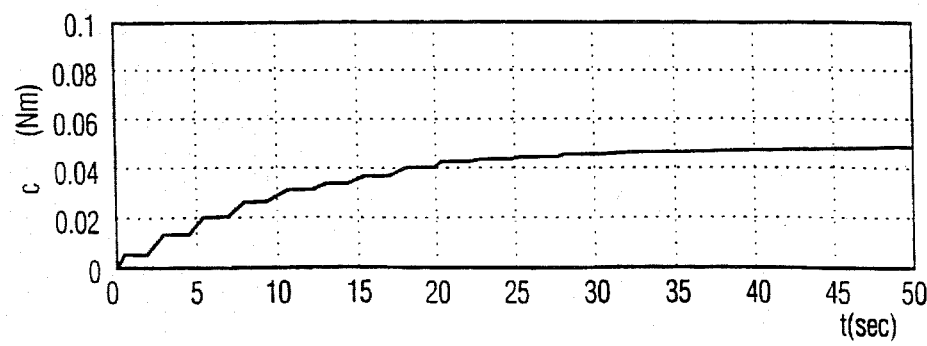
FIG. 9B(4)

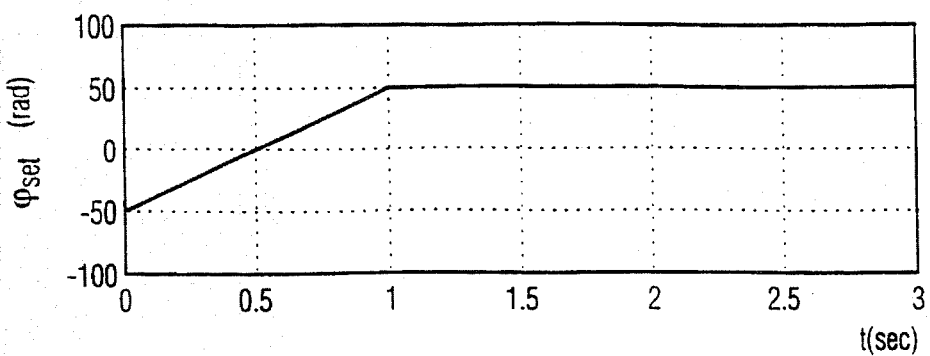
FIG. 9C(1)
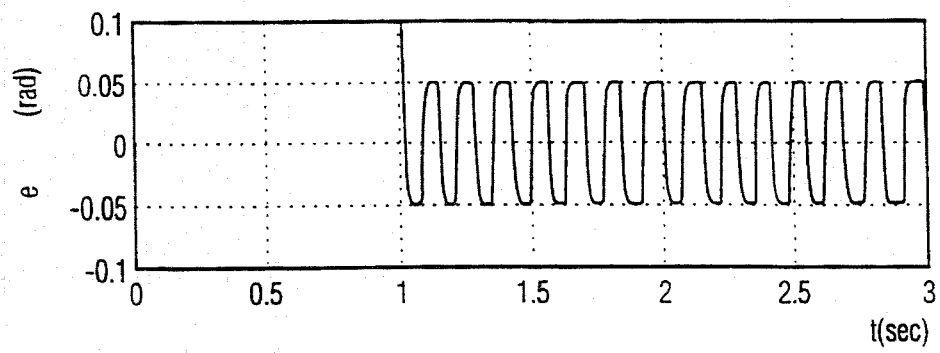
FIG. 9C(2)
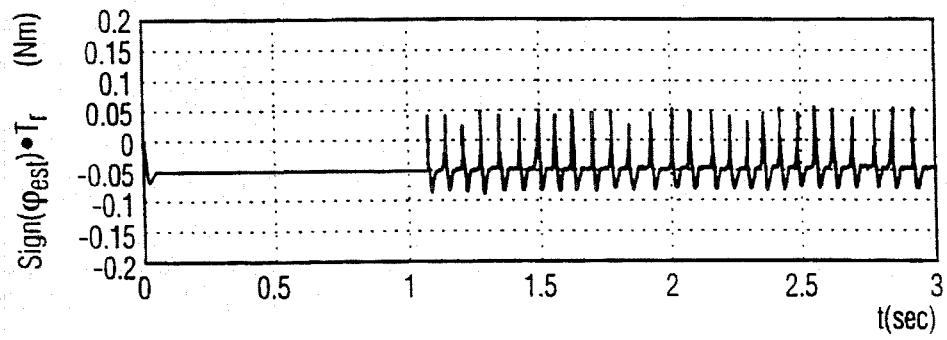
FIG. 9C(3)
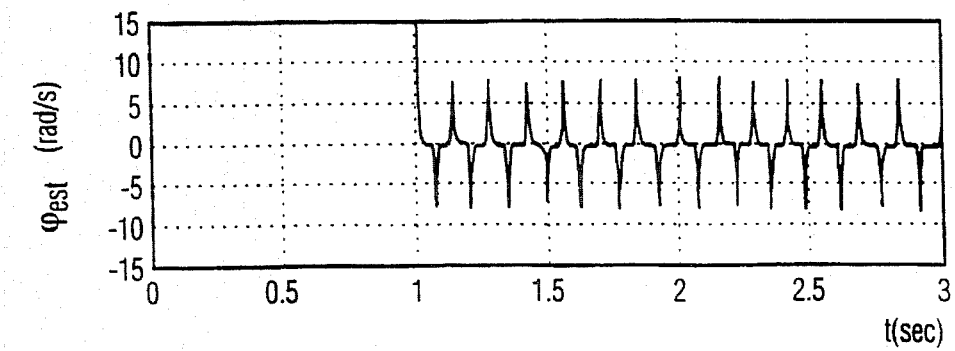
FIG. 9C(4)

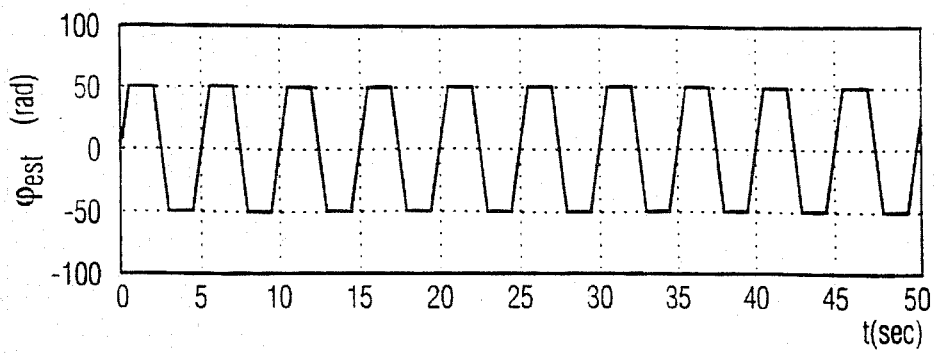
FIG. 9D(1)
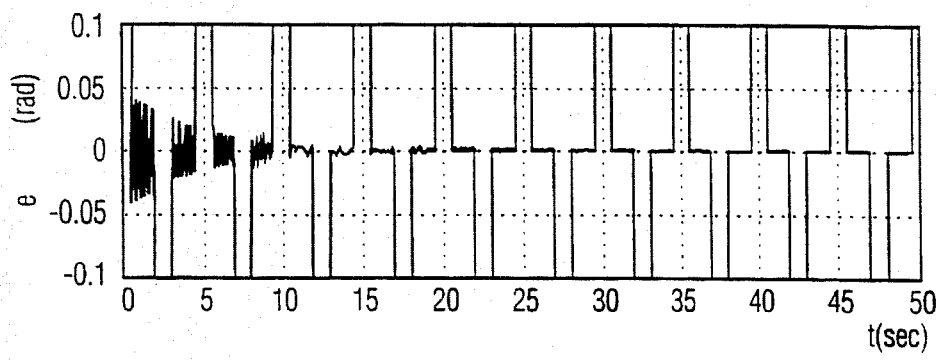
FIG. 9D(2)
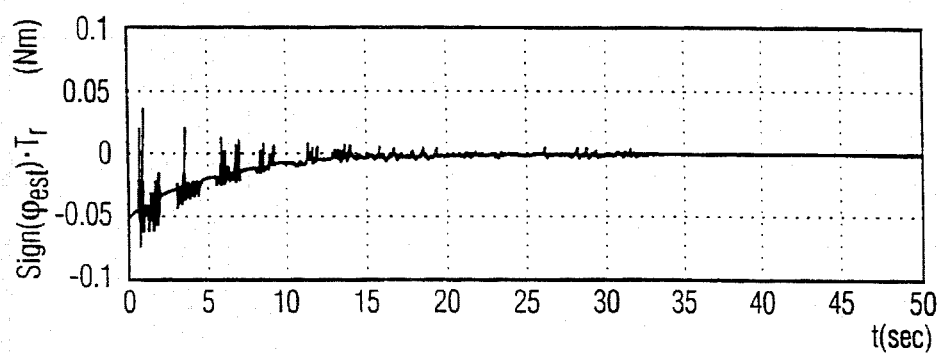
FIG. 9D(3)
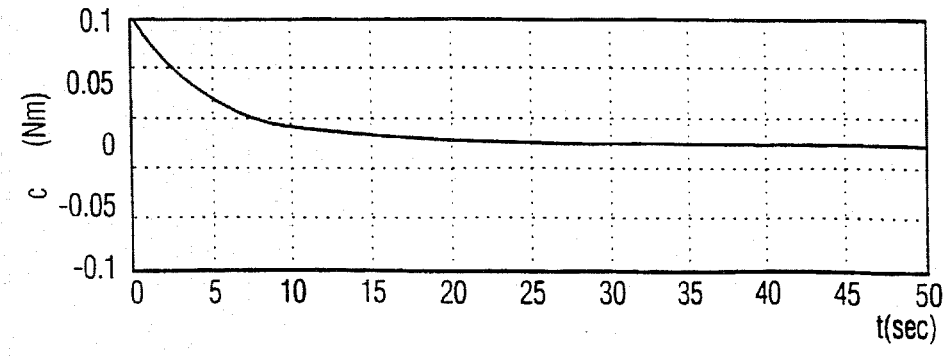
FIG. 9D(4)

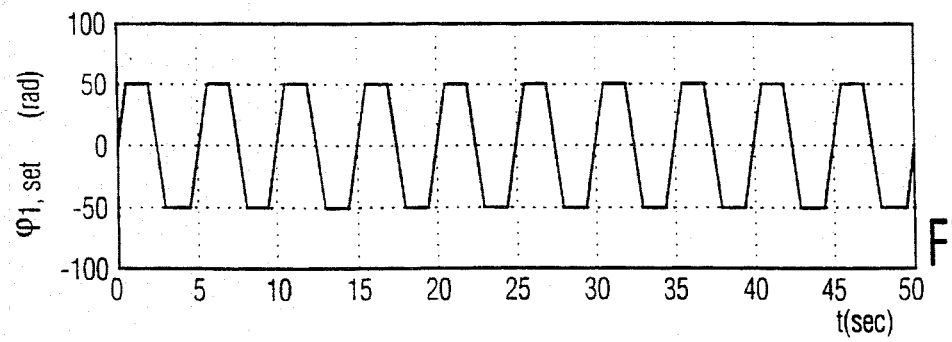
FIG. 11A(1)
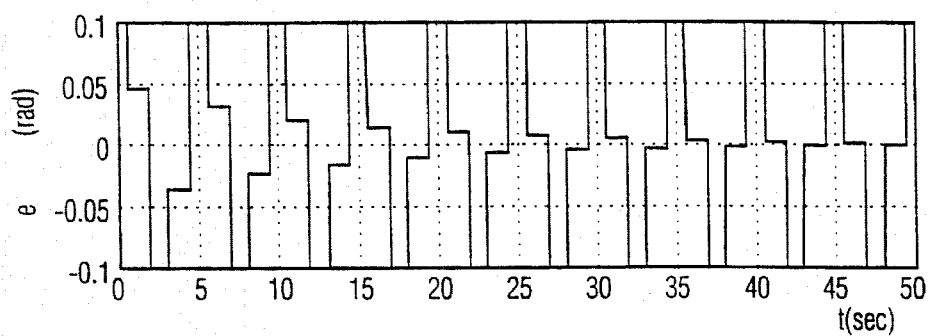
FIG. 11A(2)
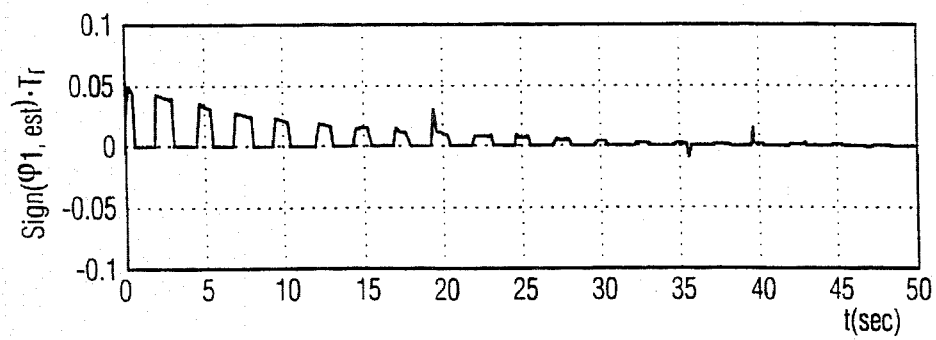
FIG. 11A(3)
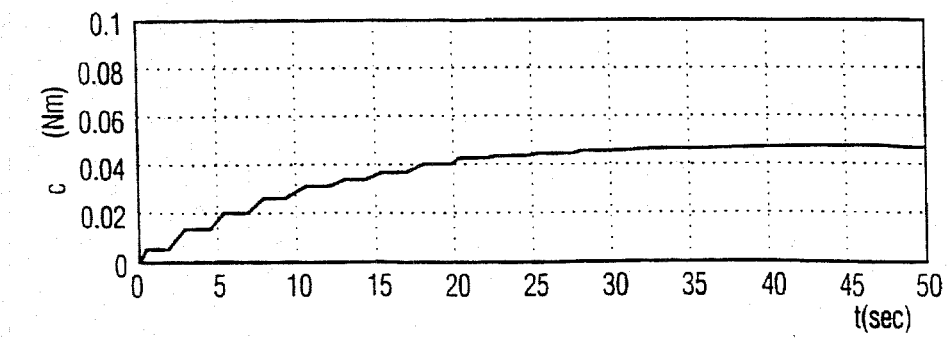
FIG. 11A(4)

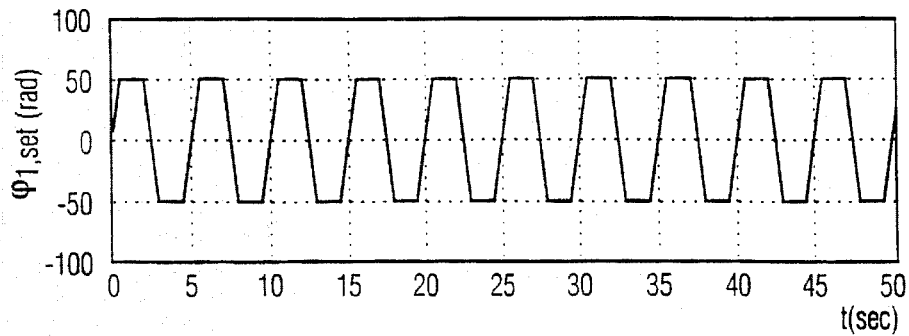
FIG. 11B(1)
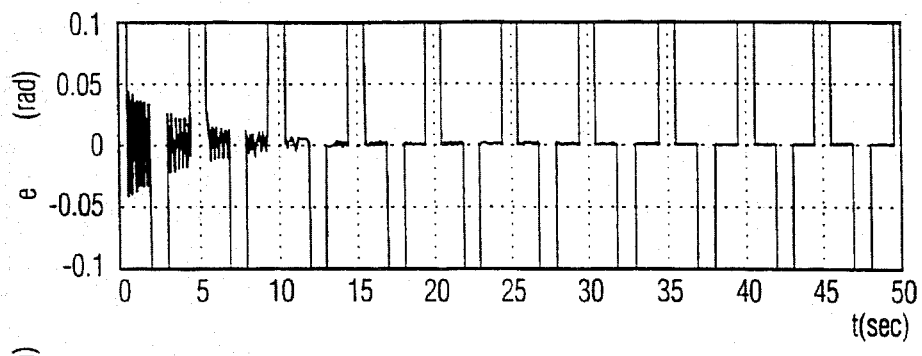
FIG. 11B(2)
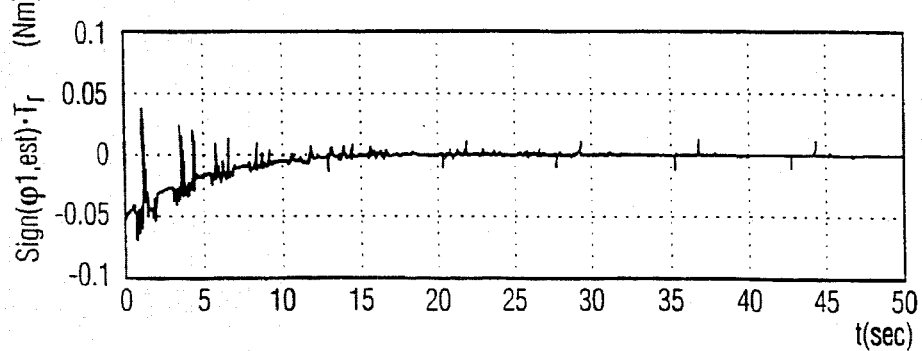
FIG. 11B(3)
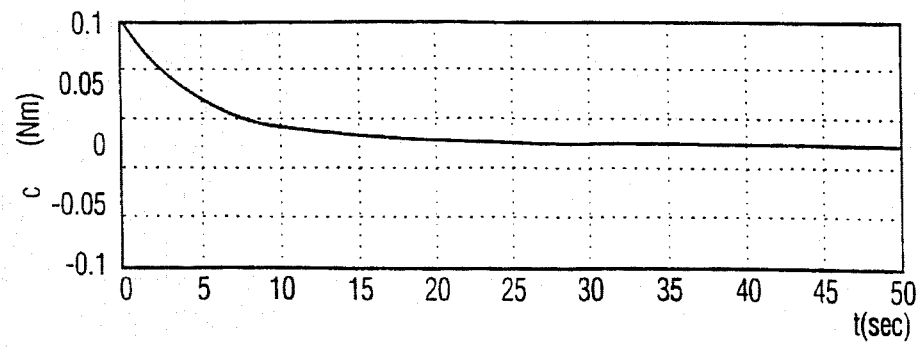
FIG. 11B(4)

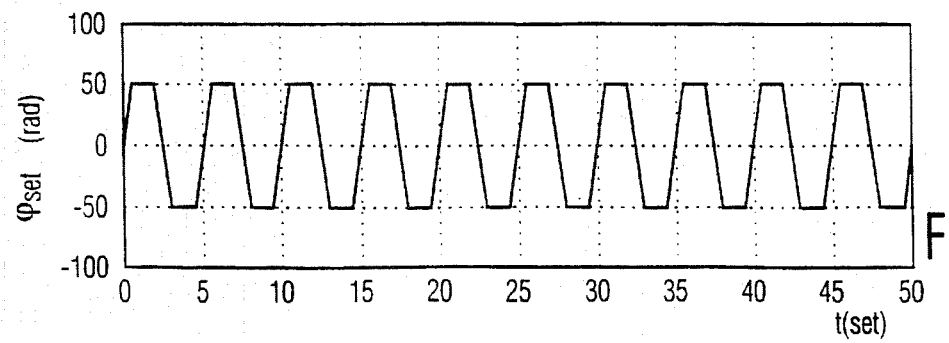
FIG. 12A(1)
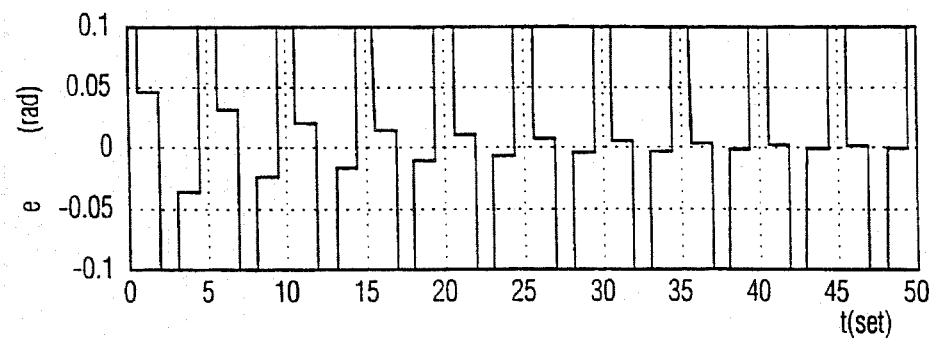
FIG. 12A(2)
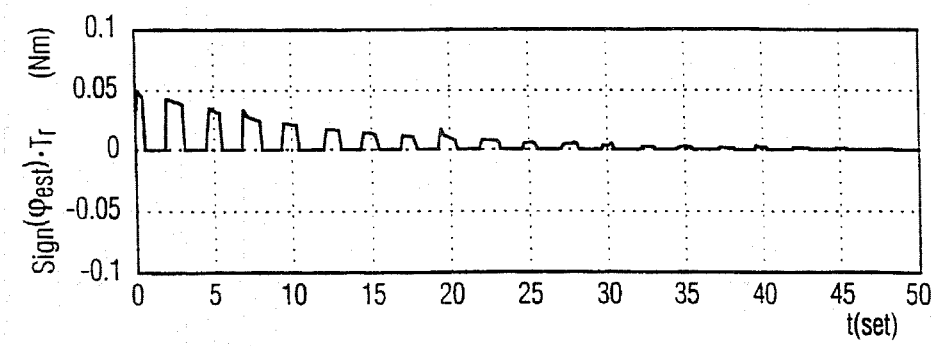
FIG. 12A(3)
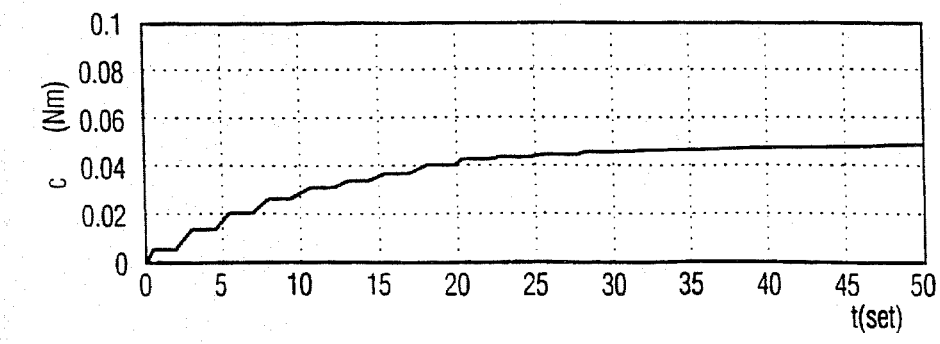
FIG. 12A(4)

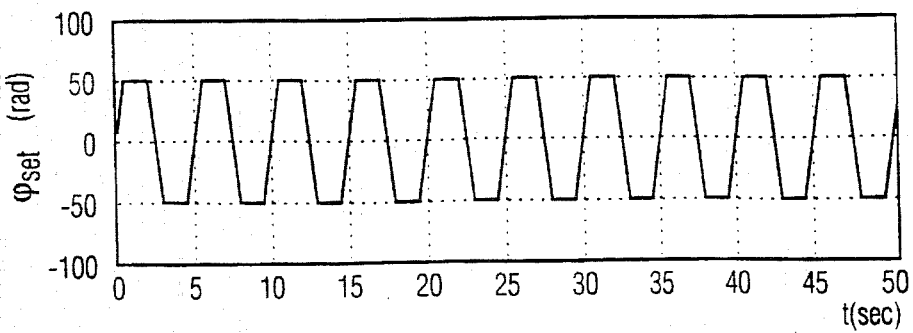
FIG. 12B(1)
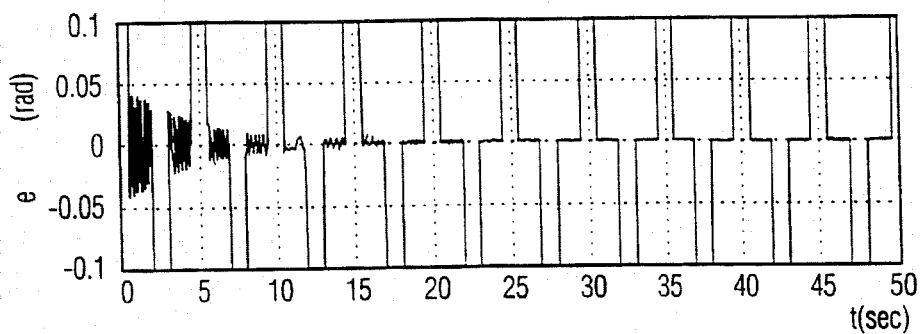
FIG. 12B(2)
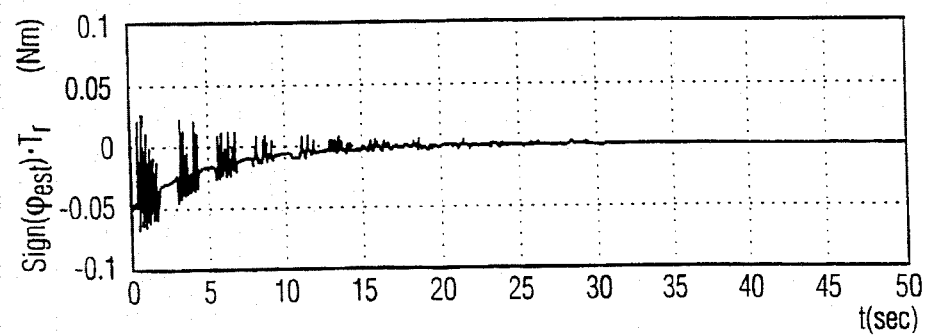
FIG. 12B(3)
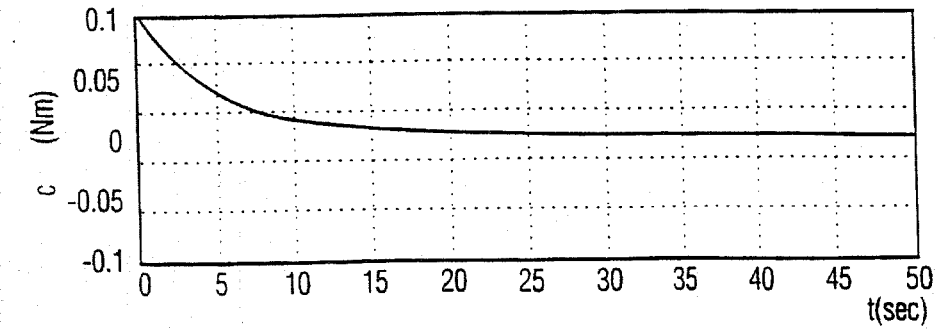
FIG. 12B(4)

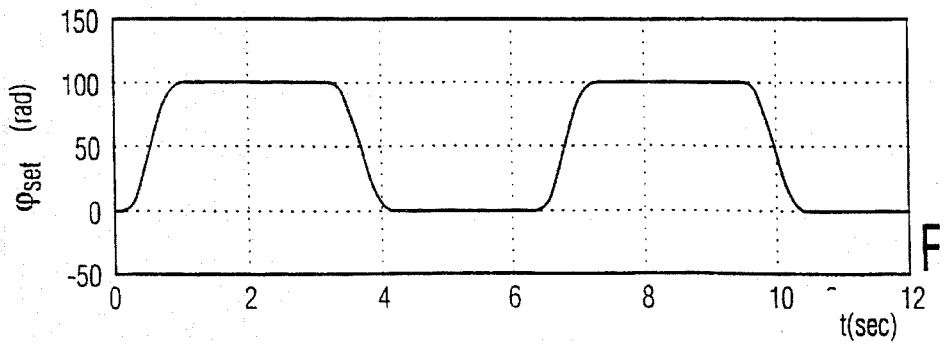
FIG. 15A(1)
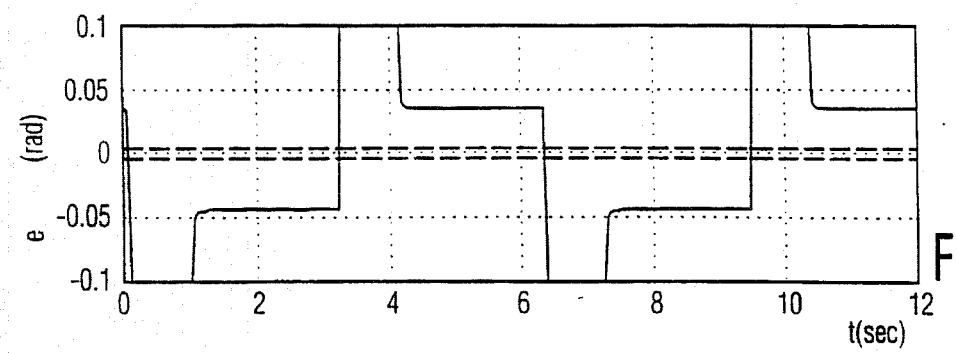
FIG. 15A(2)
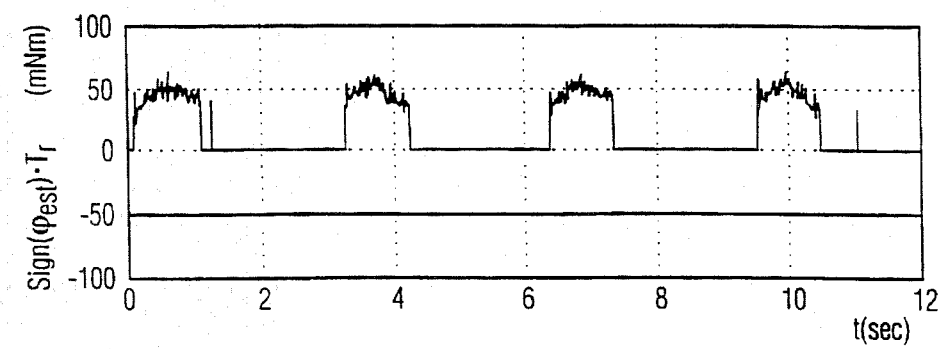
FIG. 15A(3)
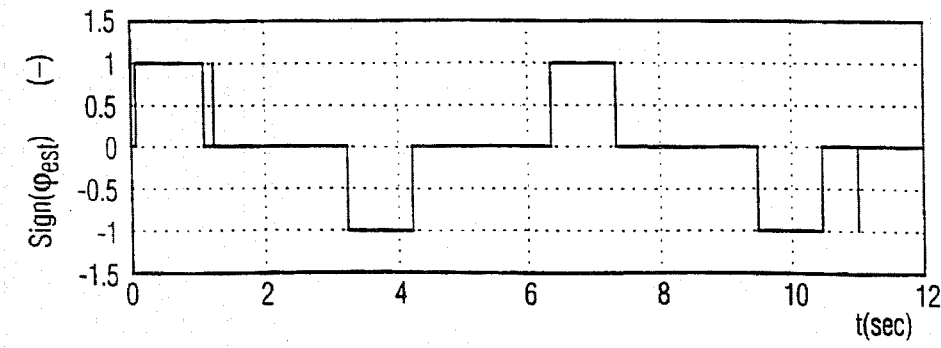
FIG. 15A(4)

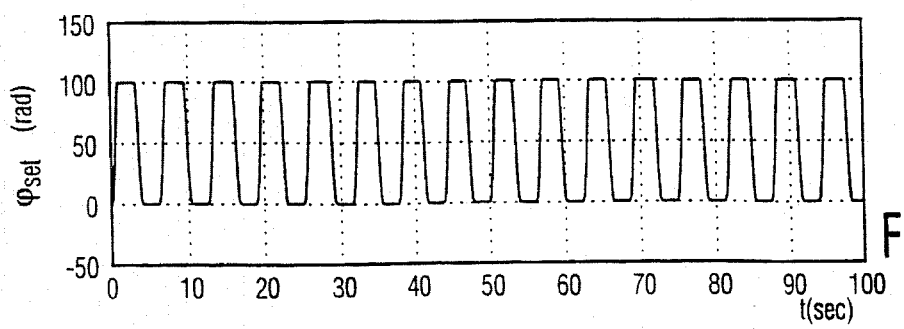
FIG. 15B(1)(a)
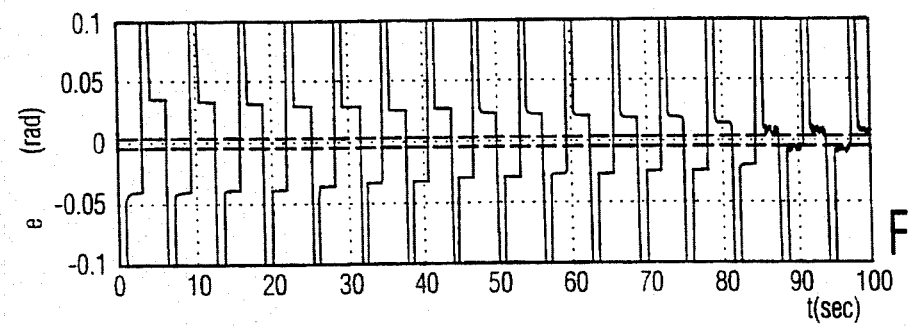
FIG. 15B(1)(b)
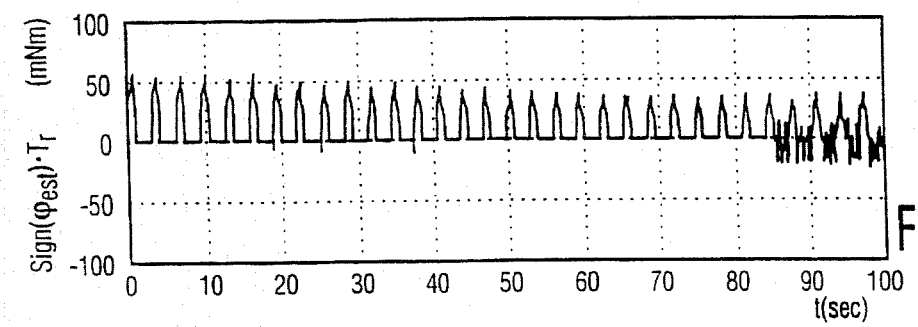
FIG. 15B(1)(c)
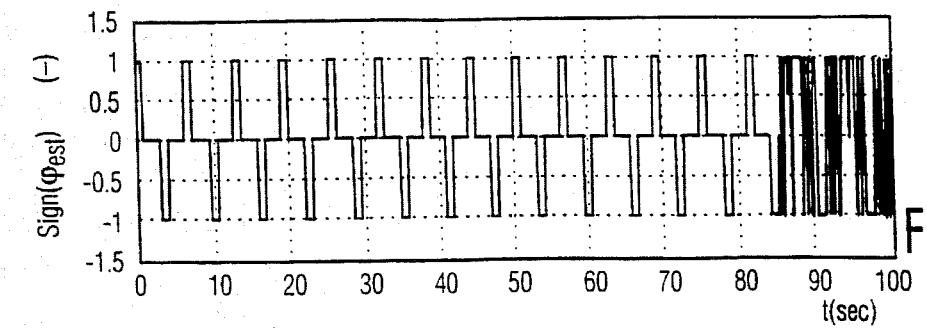
FIG. 15B(1)(d)

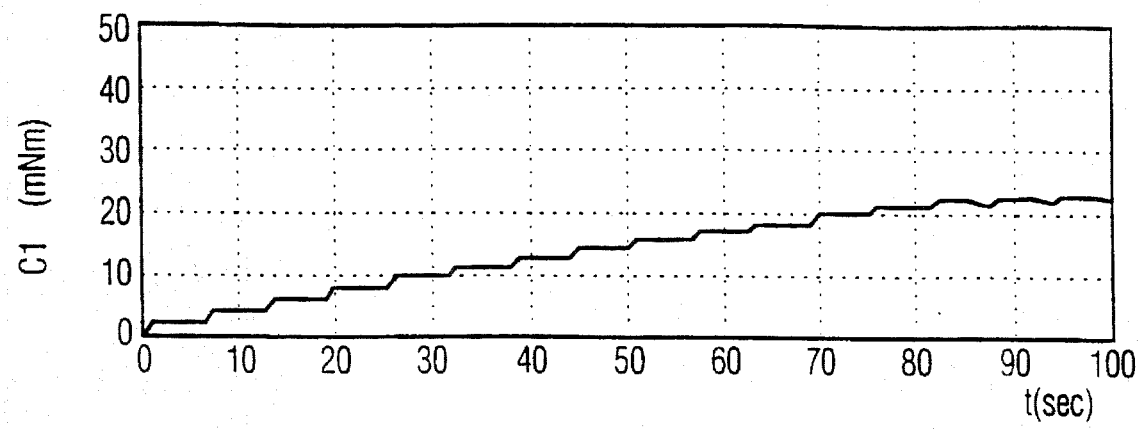
FIG. 15B(2)(a)
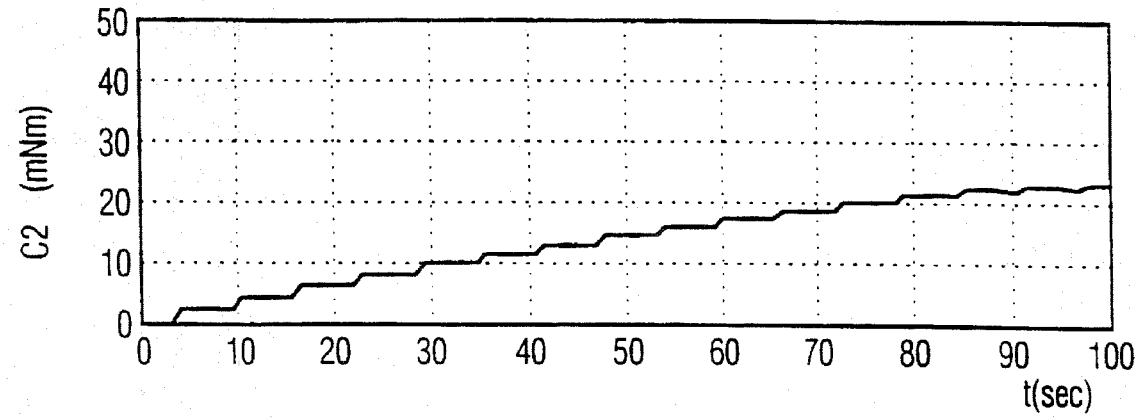
FIG. 15B(2)(b)

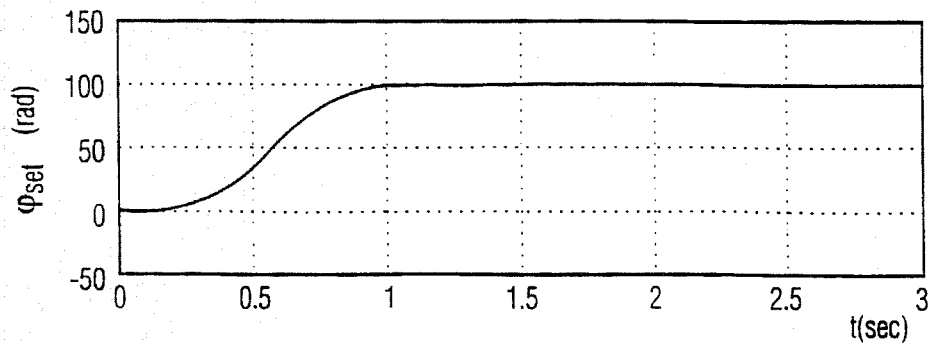
FIG. 15C(1)
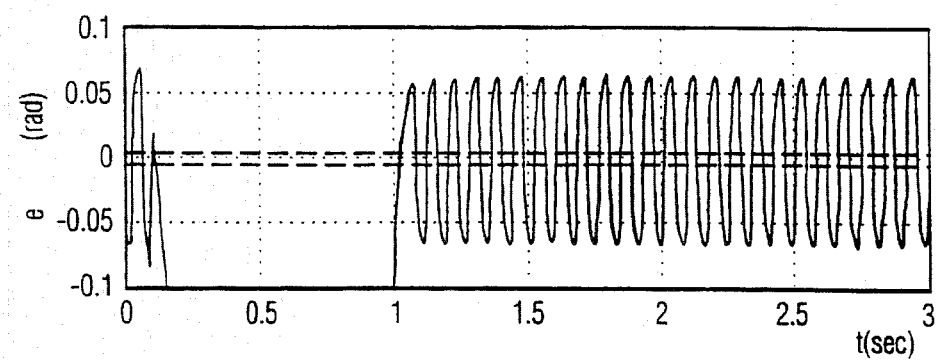
FIG. 15C(2)
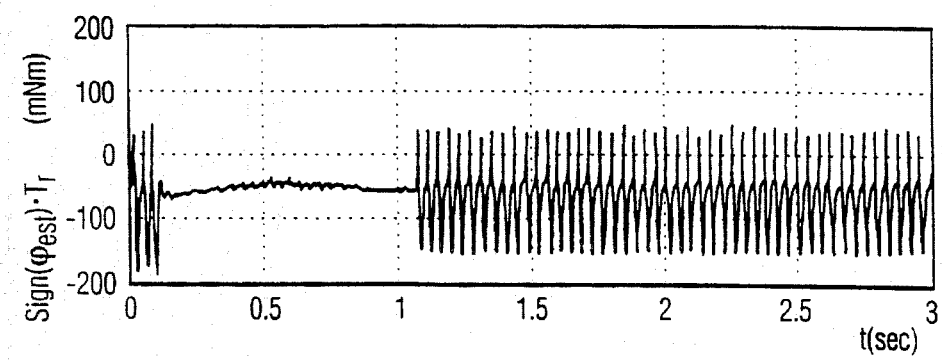
FIG. 15C(3)
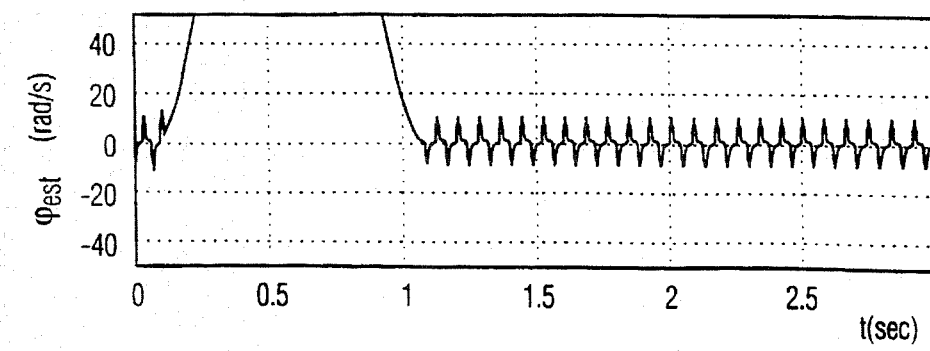
FIG. 15C(4)

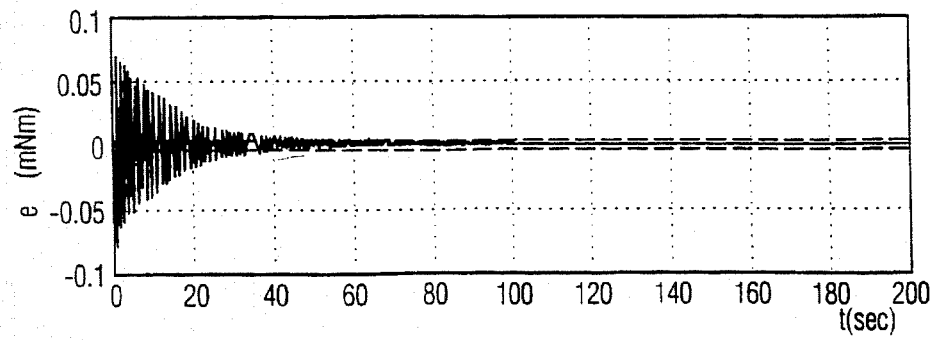
FIG. 15D(1)
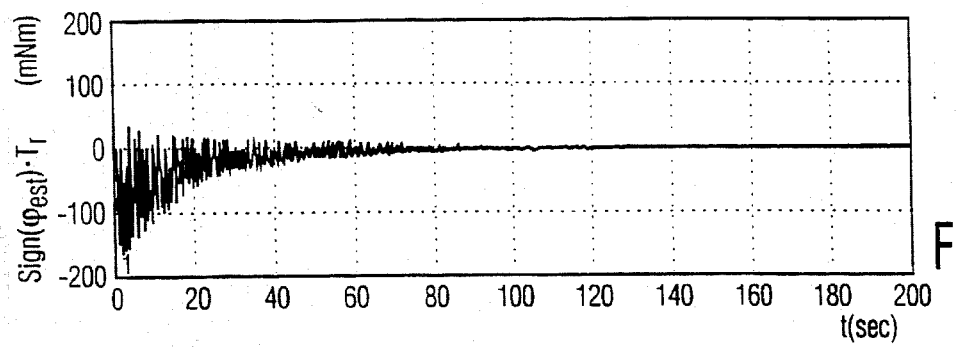
FIG. 15D(2)
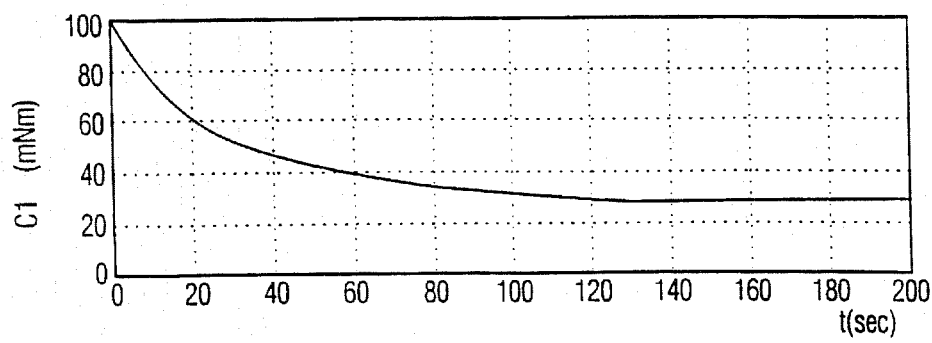
FIG. 15D(3)
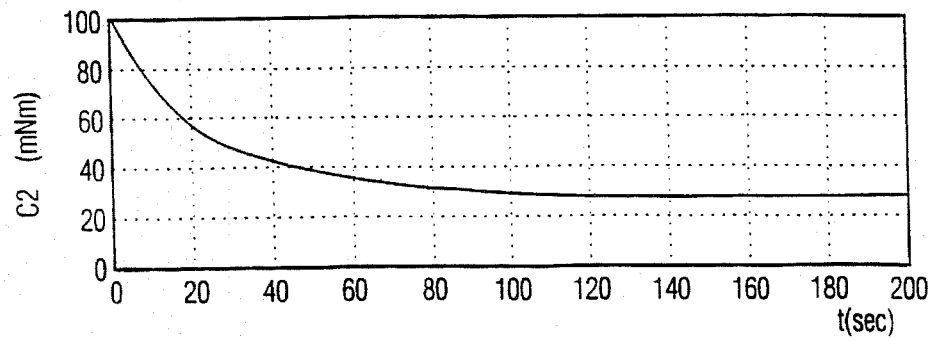
FIG. 15D(4)

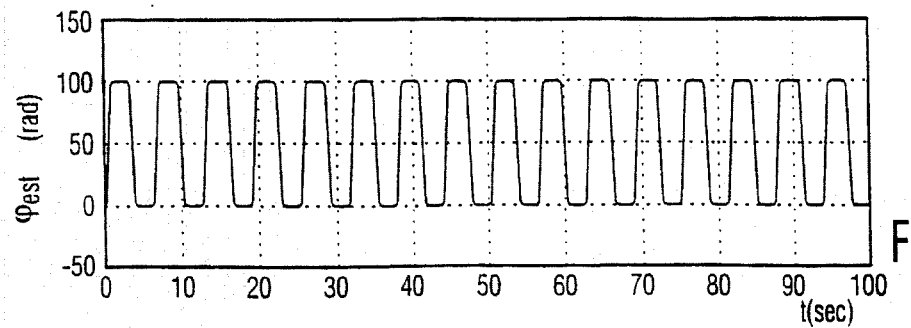
FIG. 15E(1)(a)
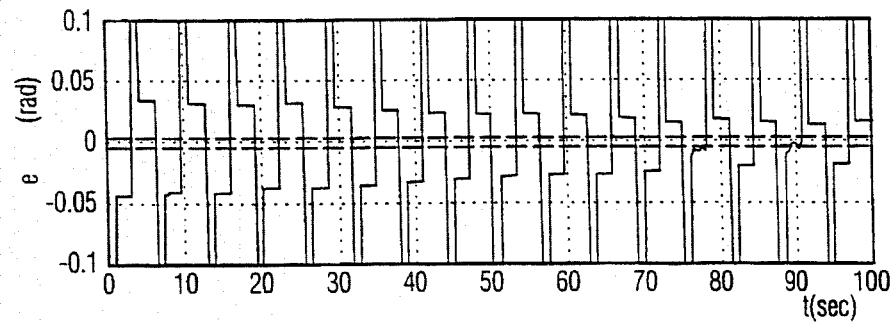
FIG. 15E(1)(b)
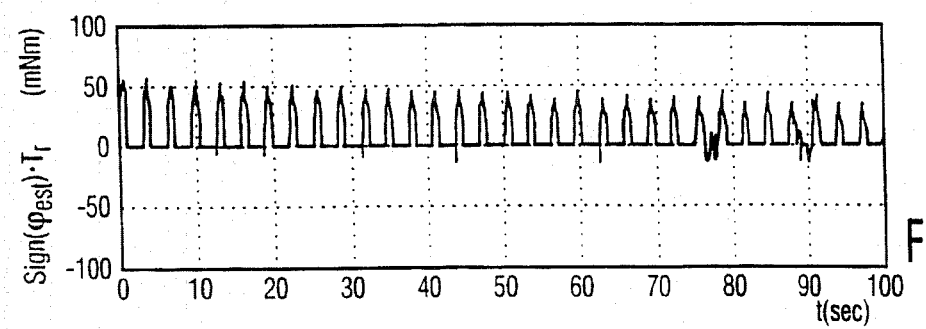
FIG. 15E(1)(c)
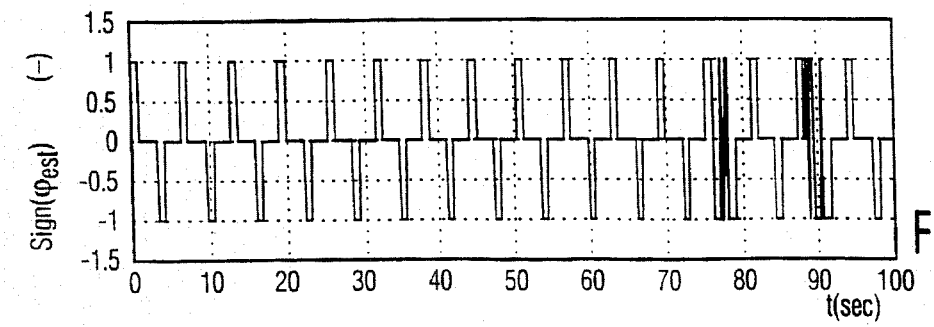
FIG. 15E(1)(d)

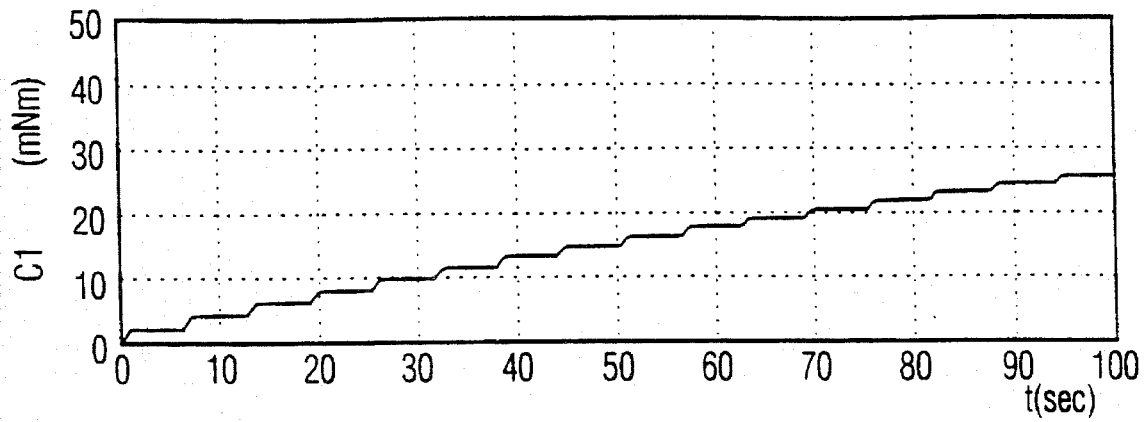
FIG. 15E(2)(a)
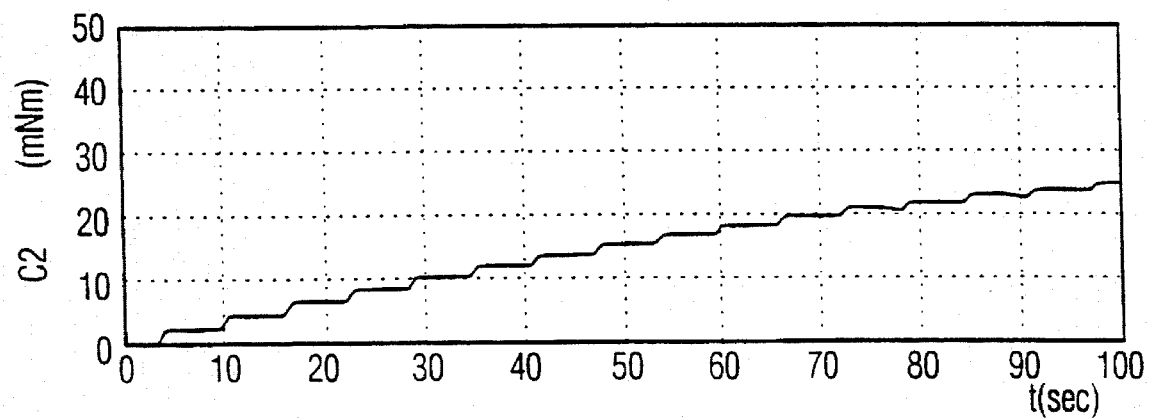
FIG. 15E(2)(b)

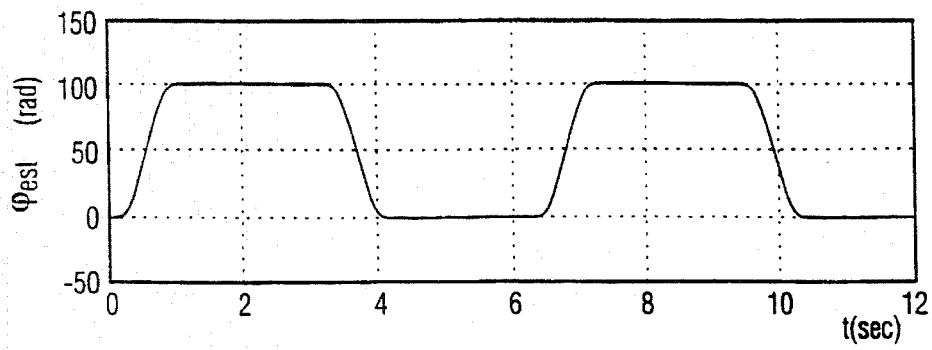
FIG. 15F(1)
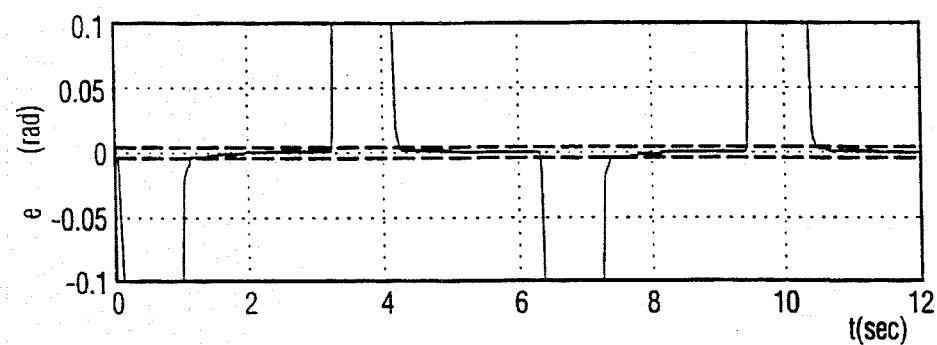
FIG. 15F(2)
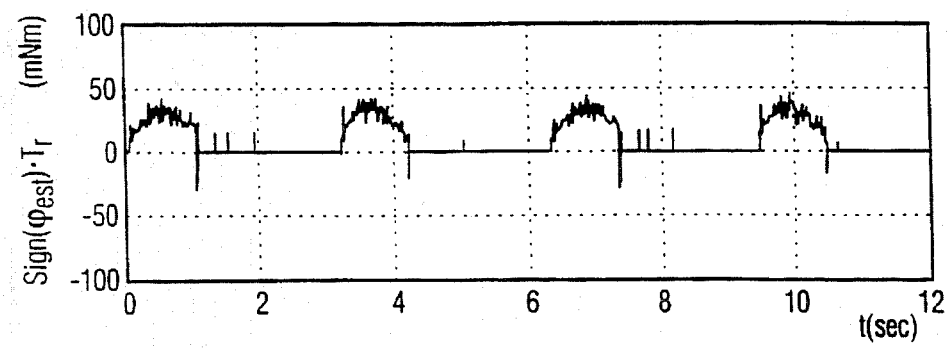
FIG. 15F(3)
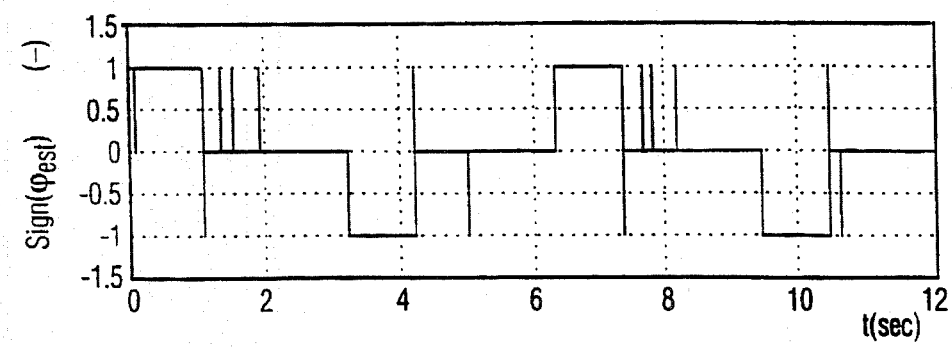
FIG. 15F(4)

CONTROLLER

This is a continuation of application Ser. No. 08/164,226, filed Dec. 7, 1993 abandoned. Priority of application Ser. No. 92203795.7, filed on Dec. 7,1992 in EUROPE, is claimed under 35 U.S.C. 119 abandoned.

BACKGROUND OF THE INVENTION

1. Field of the Invention

The invention relates to a controller for controlling a non-linear mechanical system having a plurality of degrees of freedom.

2. Description of the Related Art

A degree of freedom is a possibility of the mechanical system to move in a certain direction, like a translation along an x-,y- and/or z-axis or a rotation around an x-,y- and/or z-axis. A mechanical system can have a plurality of degrees of freedom, which need to be controlled to obtain a desired position or rotation.

Such a controller is used to realise for example accurate positioning of a mechanical system. Examples of such mechanical systems can be found in both consumer products (so-called CD-players, DCC-players) and in industrial production equipment (watersteppers, component-placement-equipment). Many mechanical systems are subject to friction and/or backlash, which makes it difficult to position the mechanical system accurately. Instead of demanding higher accuracy of the mechanical system, which inevitably leads to more expensive components, a controller can be used. However, controllers which control the non-linear aspects of the mechanical system, like friction and backlash, and which accurately position a mechanical system are not known.

SUMMARY OF THE INVENTION

It is an object of the invention to provide a controller for controlling non-linear mechanical systems and obtaining a relatively high position accuracy.

This controller according to the invention is characterized in that the controller comprises a subtracter for subtracting an output signal of the mechanical system from a setpoint signal, the output signal of the subtracter being the input signal of a control unit of the controller, the controller further comprises compensation means to compensate the non-linear behaviour of the mechanical system, the controller further comprises an adder for adding an output signal of the compensation means to an output signal of the control unit, the output signal of the adder being the input signal of the mechanical system, the controller further comprises a reference model of both the control unit and the linearized mechanical system, the setpoint signal being an input signal of the reference model, and the controller further comprises adaptation means which adapt the compensation means in dependence on a difference between the output signal of the mechanical system and the output signal of the reference model.

The reference model, which is a model of the control unit and the linearized mechanical system, receives the same setpoint signals as the control unit and the non-linear mechanical system. Assuming that the reference model gives a good description of the linear part of the mechanical system, the difference between the output of the reference model and the non-linear mechanical system originates from the non-linear part of the mechanical system. The compensation means comprises a model of the non-linear part of the mechanical system. Based on the output signal of the mechanical system, the compensation means adds a compensation signal to the output signal of the control unit. If the model of the non-linear part of the mechanical system gives a good description of the non-linearity of the mechanical system, the difference between the output of the reference model and the output of the non-linear mechanical system will be zero. If the difference is not zero than the model of the non-linear part of the mechanical system is not correct. In that case, the adaptation means adapts the model of the compensation means as long as the difference between the output of the reference model and the output of the non-linear mechanical system is not zero.

Another advantage of adaptation of the compensation is that temperature, wear and time dependence of the non-linear part of the mechanical system are taken into account.

An embodiment of the controller according to the invention is characterized in that the non-linear behaviour of the mechanical system is due to Coulomb-friction which compensated for by the is compensation means, whereby the output signal of the compensation means represents a compensation force $F_c$, which depends on the direction of a velocity V of the mechanical system according to:

if $V < -\epsilon$ then $F_c = -c_2$ if $|V| \leq \epsilon$ then $-c_2 \leq F_c \leq c_1$ if $V > \epsilon$ then $F_c = c_1$ whereby $\epsilon$ is a velocity below which accurate determination of the direction of the velocity is not possible, $c_1$, $c_2$ are compensation values, and the compensation force $F_c$ is added to a force output signal $F_s$ of the control unit.

Coulomb-friction is friction which can be described as a constant friction force which opposes the motion of the mechanical system, when the velocity of the mechanical system is not zero. A relatively small dead zone $\epsilon$ around zero velocity is used, because the direction of the velocity can only be determined when the mechanical system is moving with a minimum velocity $\epsilon$. In many mechanical systems the fiction can be described as Coulomb-friction.

A correct determination of the value $c_1$, $c_2$ of the compensation is very important: if the compensation is smaller than the fiction present, no full suppression of the friction effect will take place; if the compensation is greater than the friction present, limit cycling will occur.

The compensation is determined according to another embodiment of the controller according to the invention, which is characterized in that the adaptation means adapts the compensation values $c_1$, $c_2$ by calculating a remaining force $F_r$, which depends on a difference between a position output signal of the mechanical system and a position output signal of the reference model, after which new values for $c_1$ and $c_2$ are calculated according to if $V > \epsilon$ then $c_1 = \int_{t_0}^{t} \tau F_r dt + c_1(t_0)$, $c_2$ is not changed and $F_c = c_1$ if $V < -\epsilon$ then $c_1$ is not changed, $c_2 = \int_{t_0}^{t} -\tau F_r dt + c_2(t_0)$ and $F_c = -c_2$ if $|V| \leq \epsilon$ and $e > \alpha$ then $c_1$ and $c_2$ are not changed and $F_c = c_1$ if $|V|\leq \epsilon$ and $e<-\alpha$ then $c_1$ and $c_2$ are not changed and $F_c=-c_2$ if $|V|\leq \epsilon$ and $|e|\leq \alpha$ then $c_1$, $c_2$ and $F_c$ are not changed with:

$t_0$: the moment at which the velocity changes its direction $\tau$: adaptation factor e: difference between a position setpoint signal and the position output signal of the mechanical system $\alpha$: desired accuracy.

The adaptation means will strive to reduce the remaining force $F_r$ to zero all the time, in which case full compensation takes place. In this way a high position accuracy is obtained. The model of the compensation means is only adapted when the velocity is larger than $\epsilon$. When the velocity is smaller than $\epsilon$, the direction of the compensation might be adapted if the desired accuracy is not yet obtained.

The compensation is determined according to a further embodiment of the controller according to the invention, which is characterized in that the adaptation means adapts the compensation values $c_1$, $c_2$ by calculating a remaining force $F_r$, which depends on a difference between a position output signal of the mechanical system and a position output signal of the reference model, after which new values for $c_1$ and $c_2$ are calculated according to $$\text{if } V > \epsilon \text{ then } c_1 = \int_{t_0}^{t} \tau F_r dt + c_1(t_0),$$

$$c_2 \text{ is not changed and } F_c = c_1$$

if $|V| \leq \epsilon$ then $c_1$ and $c_2$ are not changed and $F_c = 0$ if $V < -\epsilon$ then $c_1$ is not changed, $$c_2 = \int_{t_0}^{t} -\tau F_r dt + c_2(t_0) \text{ and } F_c = -c_2$$

with $t_0$: the moment at which the velocity changes its direction $\tau$: adaptation factor.

The adaptation means will strive to reduce the remaining force $F_r$ to zero all the time, in which case full compensation takes place. The adaptation is very easy and the obtained position accuracy is good.

Another embodiment of the controller according to the invention is characterized in that the control unit comprises proportional and derivative feedback.

Such a control unit can easily be implemented and is relatively fast.

An embodiment of the controller according to the invention is characterized in that the control unit comprises integral feedback.

With the integral feedback, the output signal of the mechanical system will always become equal to the setpoint signal.

An embodiment of the controller according to the invention is characterized in that acceleration terms in the remaining force $F_r$ are neglected by the adaptation means.

The effect of the acceleration terms on the adaptation of the compensation is relatively small. Neglecting the acceleration terms makes it easier to calculate the remaining force $F_r$.

BRIEF DESCRIPTION OF THE DRAWINGS

The invention will be explained in more detail with reference to the drawings in which FIG. 7 shows another controller according to the invention, comprising the controlled compensated system of FIG. 6, FIG. 8 shows a PID-control unit of a controller according to the invention, FIGS. 9a–d show results of a computer simulation of a second order mechanical system and a PD-control unit, FIG. 10 shows a simplified model of a fourth order system, FIGS. 11a–b show results of a computer simulation of a controller for the fourth order system of FIG. 10;

FIGS. 12a–b show results of a computer simulation of a controller whereby acceleration terms are neglected by adaptation means of the controller, FIG. 14 shows a mechanical system, FIGS. 15a–f show results of experiments with a controller and the mechanical system of FIG. 14.

DESCRIPTION OF THE PREFERRED EMBODIMENT

Figure 1:
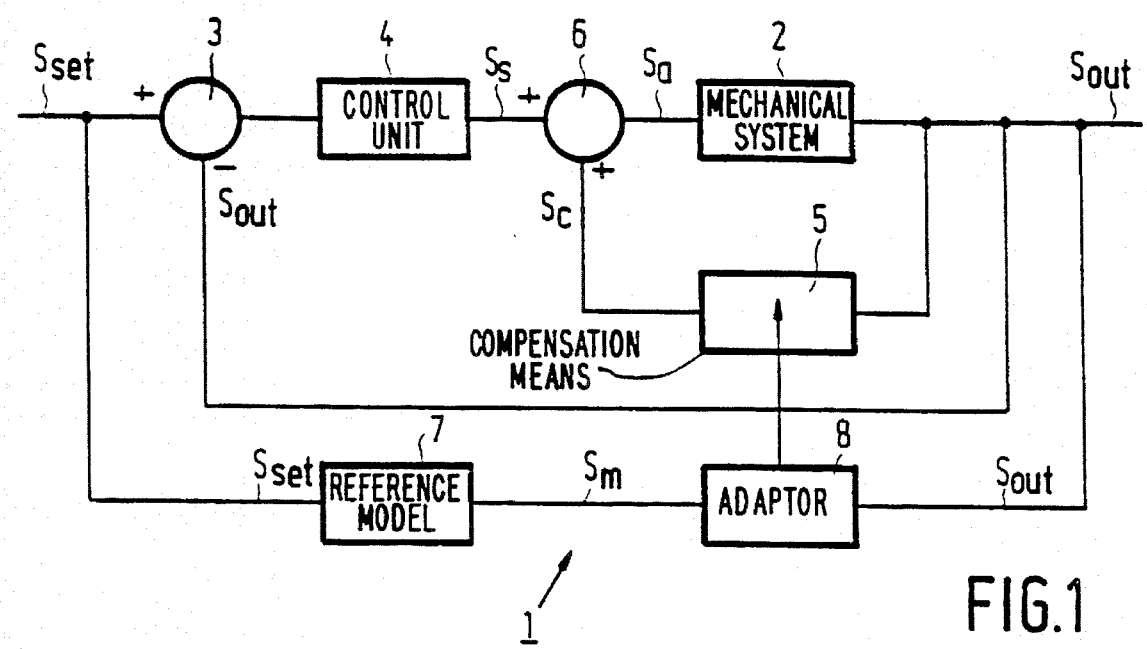
FIG. 1 shows a controller according to the invention.

The same reference numerals are used for the corresponding parts in the various figures.

FIG. 1 shows diagrammatically a controller 1 according to the invention for controlling a non-linear mechanical system 2. The controller 1 comprises a subtracter 3 for subtracting an output signal $S_{out}$ of the mechanical system 2 from a setpoint signal $S_{set}$. The output signal of the subtracter 3 is the input signal of a control unit 4 of the controller 1. The controller 1 further comprises compensation means 5 to compensate the non-linear behaviour of the mechanical system 2. The controller 1 further comprises an adder 6 for adding an output signal $S_c$ of the compensation means 5 to an output signal $S_s$ of the control unit 4. The output signal $S_a$ of the adder 6 is the input signal $S_a$ of the mechanical system 2. The controller 1 further comprises a reference model 7 of both the control unit 4 and the linearized mechanical system 2, the setpoint signal $S_{set}$ being an input signal of the reference model 7. The controller 1 further comprises adaptation means 8 which adapts the compensation means 5 in dependence on a difference between the output signal $S_{out}$ of the mechanical system 2 and the output signal $S_m$ of the reference model 7. The reference model 7 gives a description of the linear part of the mechanical system, so that the difference between the output signal $S_m$ of the reference model 7 and the output signal $S_{out}$ of the non-linear mechanical system 2 originates from the non-linear part of the mechanical system 2. The compensation means 5 comprises a model of the non-linear part of the mechanical system 2. If the model of the non-linear part of the mechanical system 2 gives a good description of the non-linearity of the mechanical system 2, the difference between the output signal $S_m$ of the reference model 7 and the output signal $S_{out}$ of the non-linear mechanical system 2 will be zero. If the difference is not zero than the model of the non-linear part of the mechanical system is not correct. In that case, the adaptation means 8 adapts the model of the compensation means 5 as long as the difference between the output signal $S_m$ of the reference model 7 and the output signal $S_{out}$ of the non-linear mechanical system 2 is not zero. The input $S_{set}$ of the controller 1 is one or more desired positions or rotations of the mechanical system 2, like a position along an x-,y- and/or z-axis or a rotation around an x-,y- and/or z-axis.

Figure 2:
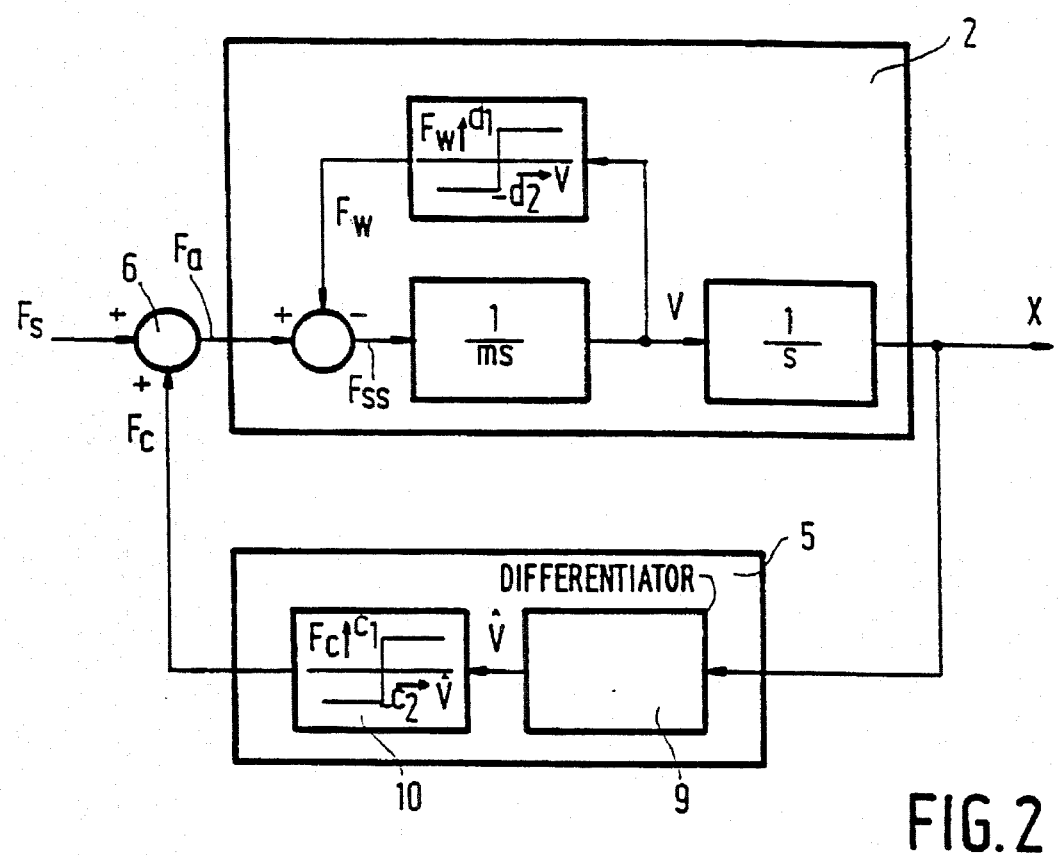
FIG. 2 shows a mechanical system with compensation means.
Figure 5:
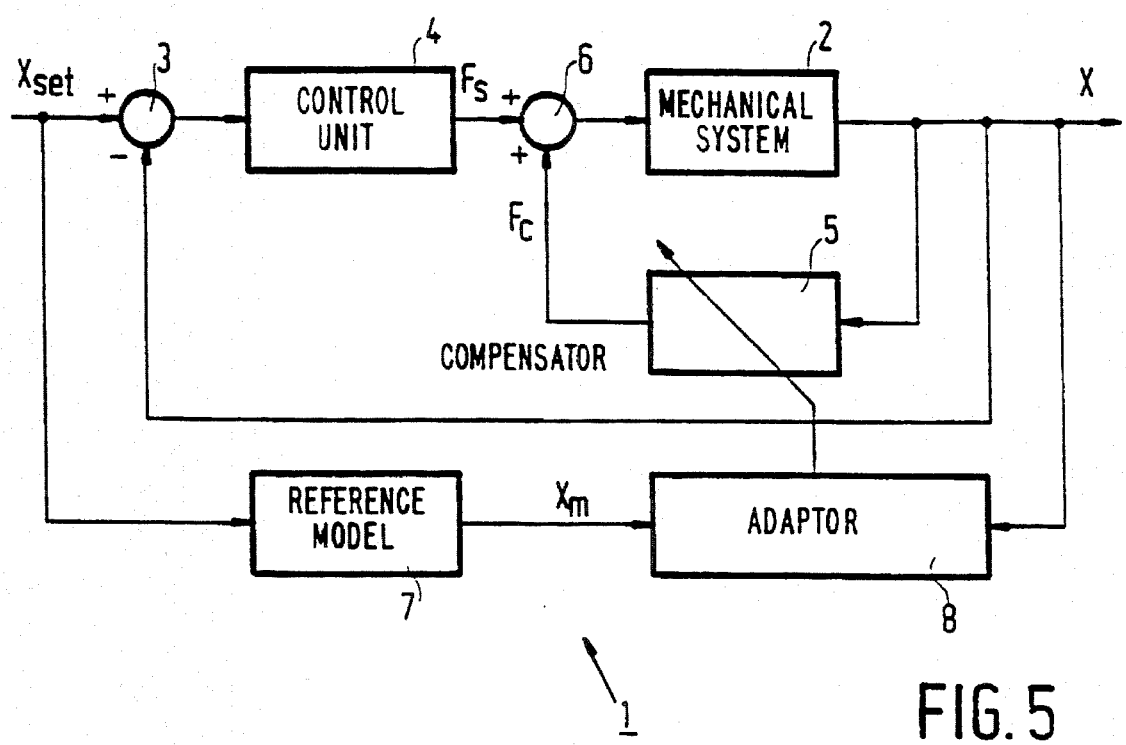
FIG. 5 shows a controller according to the invention, comprising the mechanical system and compensation means of FIG. 2 and a control unit and the reference model of FIG. 3.

FIG. 2 shows a part of the controller 1 of FIG. 5 comprising a mechanical system 2 and compensation means 5. The mechanical system 2 represents a mass m which is movable in the X-direction on a surface, whereby Coulomb-friction $F_w$ between the mass m and the surface occurs. The mechanical system 2 is denoted in the Laplace-transform. The Coulomb-fiction $F_w$ opposes the motion of the mass m, so that the force which causes the mass m to move as if there is no friction, equals $F_{ss}=F_a-F_w$, whereby $F_a$ is the force which is applied on the mechanical system 2. The Coulomb-friction $F_w=d_1$ if the velocity $V>0$ and $F_w=d_2$ if the velocity $V<0$, but the values $d_1$, $d_2$ are unknown and depend a.o. on temperature and wear. The compensation means 5 comprises a differentiator 9 which estimates a velocity $\hat{V}$ based on different position output signals x. The compensation means 5 further comprises a model 10 of the non-linear mechanical part of the mechanical system 2. The model 10 represents a Coulomb-friction whereby, the friction $F_c=c_1$ if $\hat{V}>\epsilon$ and $F_c=-c_2$ if $\hat{V}<-\epsilon$. If the velocity $|\hat{V}|\leq\epsilon$, no compensation is applied. A small dead zone is present around $\hat{V}=0$ for reasons of implementation technology; there must be a certain minimum velocity $\epsilon$ for a positive or negative speed direction to be detected. Based on the direction of the velocity $\hat{V}$, a compensation force which equals the expected friction $F_c$ is added to the force $F_s$ from the control unit 4 by the adder 6. If $c_1=d_1$ and $c_2=d_2$, the compensation force $F_c=F_w$, so that the force $F_{ss}=F_a-F_w=F_s+F_c-F_w=F_s$ is the same force which would have been applied to a mechanical system without friction. When $F_c=F_w$, full compensation is achieved.

Figure 3:
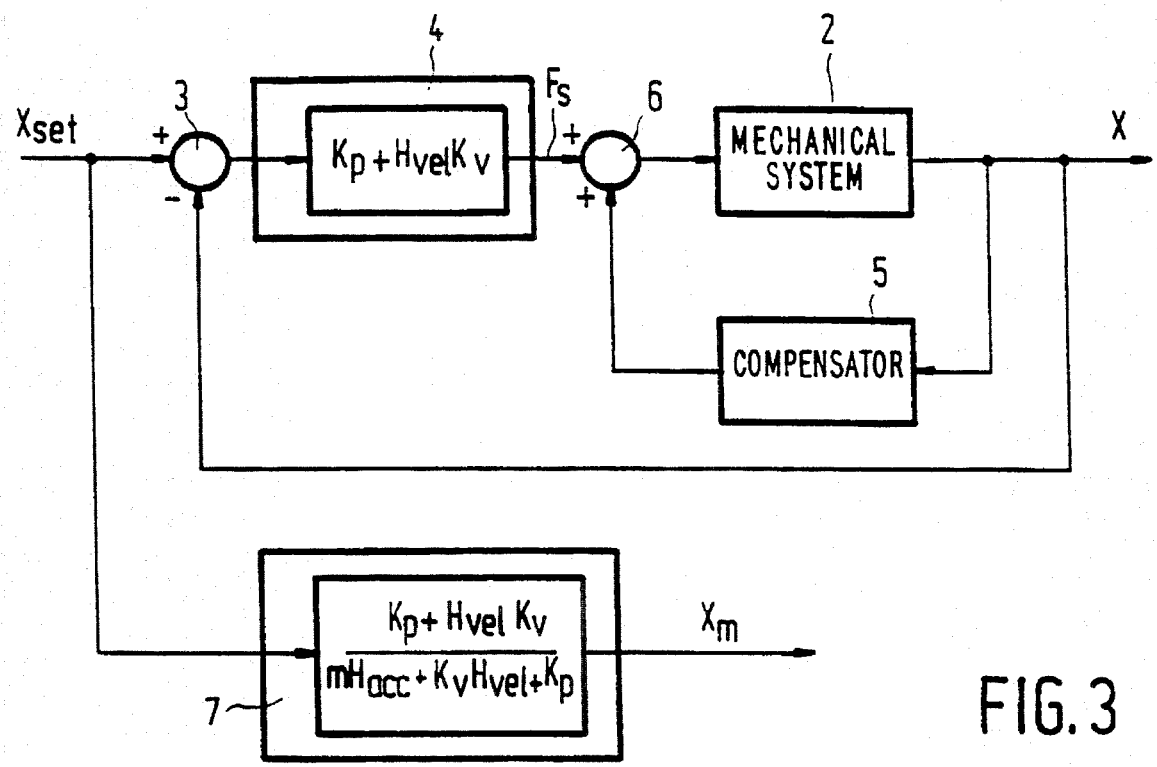
FIG. 3 shows a controlled, compensated system and a reference model of the controlled system.

FIG. 3 shows a part of the controller 1 of FIG. 5 comprising the mechanical system 2 of FIG. 2, a control unit 4, a reference model 7, a subtracter 3 and an adder 6. The subtracter 3 subtracts the position output signal x of the mechanical system 2 from a position setpoint signal $x_{set}$. The output signal $x_{set}-x$ of the subtracter 3 is the input signal of a control unit 4. The control unit 4 comprises a proportional action $k_p$, and a differentiating action $H_{vel}k_v$, whereby $k_p$ is a proportional control parameter, $k_v$ is a derivative control parameter and $H_{vel}$ represents a transfer function of a differentiating network 22, which is used to estimate the velocity $\dot{x}_{est}$. The working of the differentiating network 22 will be explained with reference to FIG. 4. The reference model 7 comprises a model of the control unit 4 and the linearized part $$\left(\frac{1}{ms^2}\right)$$

of the mechanical system 2. The input signal $x_{set}$ of the reference model 7 is the same as the input signal of the control unit 4. The output signal $x_m$ of the reference model 7 would be the same as the position x of the mechanical system 2 if no friction $F_w$ would occur on the mechanical system 2.

Figure 4:
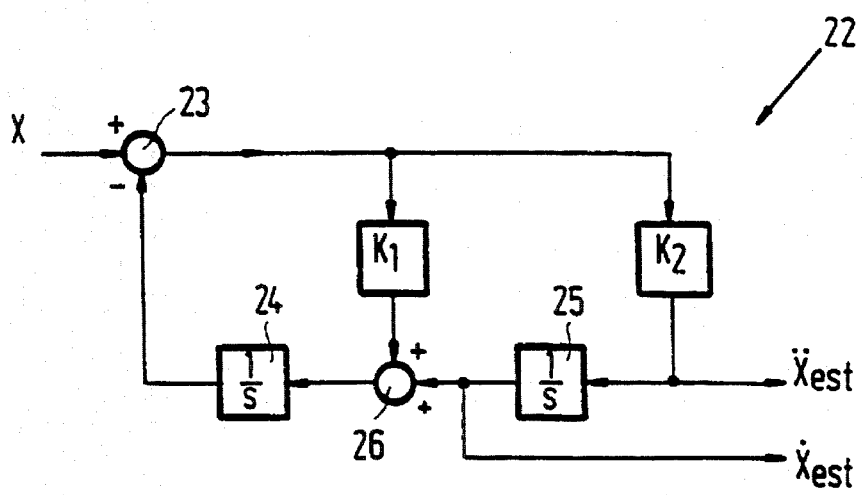
FIG. 4 shows a differentiating network.

FIG. 4 shows a differentiating network 22 which can be used to estimate the velocity $\dot{x}_{est}$ and the acceleration $\ddot{x}_{est}$ of the mass m. The differentiating network 22 comprises a subtracter 23 which subtracts an output signal of an integrator 24 from the position input signal x. The output signal of the subtracter 23 is multiplied by a constant $K_2$ and represents an estimation of the acceleration $\ddot{x}_{est}$. The estimated acceleration $\ddot{x}_{est}$ is supplied to an integrator 25. The output of the integrator 25 represents an estimation of the velocity $\dot{x}_{est}$. The output signal of the subtracter 23 is multiplied by a constant $K_1$ and added to the estimated velocity $\dot{x}_{est}$ by an adder 26. The output of the adder 26 is the input signal of the integrator 24. The transfer functions of the differentiating network 22 are:

$$H_{vel} = \frac{\dot{x}_{est}}{x} = s\frac{K_2}{s^2+K_1s+K_2}$$

$$H_{acc} = \frac{\ddot{x}_{est}}{x} = s^2\frac{K_2}{s^2+K_1s+K_2}$$

The transfer function $H_{vel}$ comprises a differentiator (s) followed by a second order low pass filter $$\left(\frac{K_2}{s^2+K_1s+K_2}\right).$$

The transfer function $H_{acc}$ comprises a double differentiator ($s^2$) followed by the same second order low pass filter. The low pass filter can be characterized by a crossover frequency $f_{dif}$ and a relative damping $\zeta_{dif}$. The constants $K_1$, $K_2$ of the low pass filter are given by $K_1=4\pi f_{dif}\zeta_{dif}$ and $K_2=(2\pi f_{dif})^2$. If the crossover frequency $f_{dif}$ is too high, noise will disturb a correct determination of $\dot{x}_{est}$ and $\ddot{x}_{est}$. If the crossover frequency $f_{dif}$ is too low, the estimation of $\dot{x}_{est}$ and $\ddot{x}_{est}$ is slow and fast changes of $\dot{x}_{est}$ and $\ddot{x}_{est}$ can not be determined. Suitable values for the crossover frequency $f_{dif}$ and a relative damping $\zeta_{dif}$ are $f_{dif}=100$ Hz and $\zeta_{dif}=0,7$.

FIG. 5 shows the complete controller 1 for controlling the mechanical system 2 of FIG. 2. The controller 1 comprises the mechanical system 2 and the compensation means 5 of FIG. 2 and the control unit 4 and the reference model 7 of FIG. 3. The controller 1 further comprises adaptation means 8. With the adaptation means 8 a difference between the real position x of the mechanical system 2 and the calculated position $x_m$ is calculated. The difference ($x_m-x$) is caused by residual non-linear forces $F_r$, which are not compensated for by the compensation means 5. The residual forces are determined as follows:

$$F_r=mH_{acc}(x_m-x)+k_vH_{vel}(x_m-x)+k_p(x_x-x)$$

whereby $H_{acc}$ represents a transfer function of a differentiating network 22, which is used to estimate the acceleration $\ddot{x}_{est}$.

The sign of $F_r$ depends on the direction of the velocity $\dot{x}_{est}$ of the mechanical system 2 and on the values of the compensation and friction. Multiplication of $F_r$ by the sign of the velocity, sign($\dot{x}_{est}$), yields the variable $F_r$ sign($\dot{x}_{est}$), the sign of which is independent of the direction of the speed.

The following holds approximately for $$\dot{x}_{est}>\epsilon \; (\text{sign}(\dot{x}_{est})=+1): F_r \text{ sign}(\dot{x}_{est})=d_1-c_1;$$

and for $$\dot{x}_{est}<-\epsilon \; (\text{sign}(\dot{x}_{est})=-1): F_r \text{ sign}(\dot{x}_{est})=d_2-c_2.$$

In these expressions, $d_1$ and $d_2$ are the friction forces for the positive and the negative directions of movement, $c_1$ and $c_2$ are the compensation forces for the positive and the negative directions of movement.

The parameters $c_1$ and $c_2$ and the compensation force $F_c$ are adapted as follows:

$$\text{if } \dot{x}_{est} > \epsilon \text{ then } c_1 = \int_{t_0}^{t} \tau F_r dt + c_1(t_0) \text{ and } F_c = c_1$$

$$\text{if } |\dot{x}_{est}| \leq \epsilon \text{ then } F_c = 0$$

$$\text{if } \dot{x}_{est} < -\epsilon \text{ then } c_2 = \int_{t_0}^{t} -\tau F_r dt + c_2(t_0) \text{ and } F_c = -c_2$$

with $t_0$: the moment at which the velocity changes its direction
$\tau$: adaptation factor.

Figure 6:
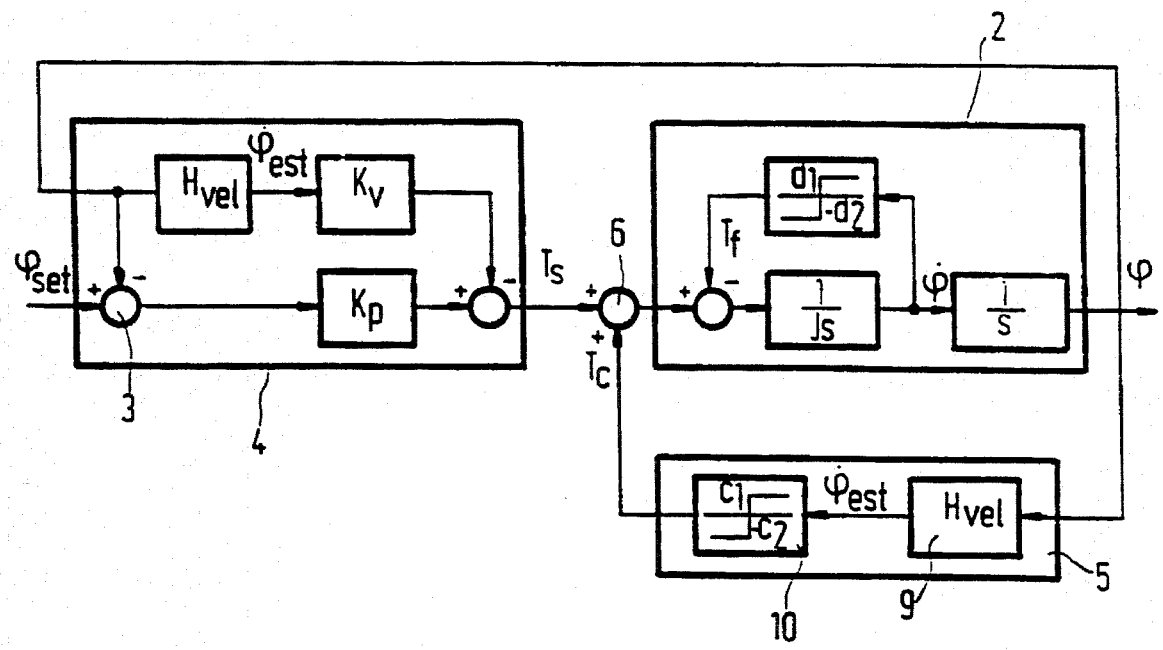
FIG. 6 shows another controlled, compensated system.
Figure 13A:
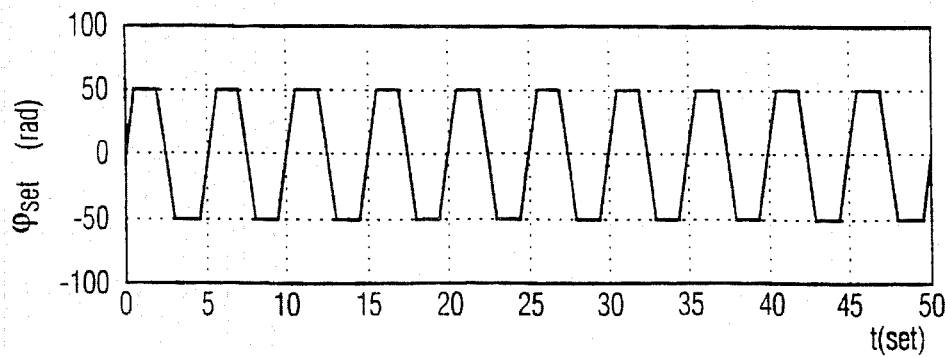
FIG. 13 shows results of a computer simulation of a controller whit a PID-control unit.
Figure 13B:
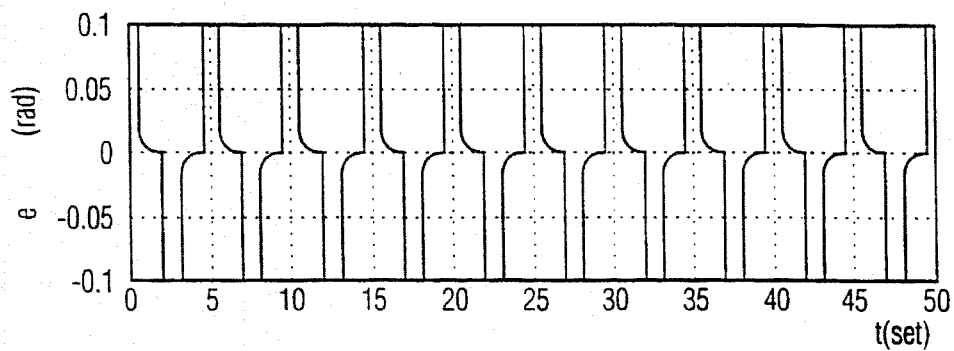
Figure 13C:
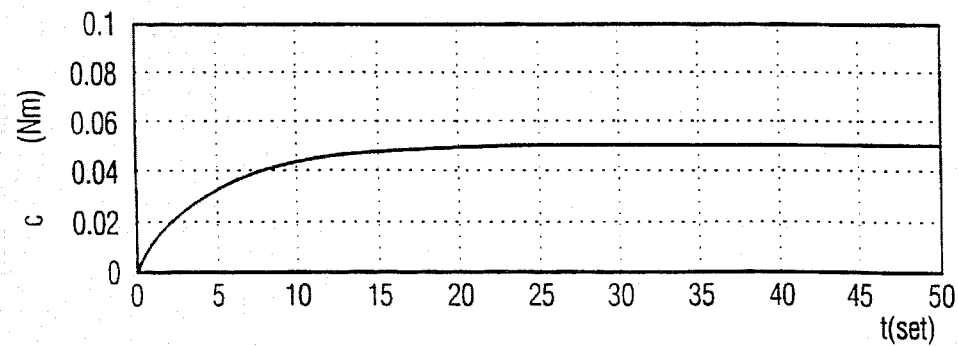
Figure 13D:
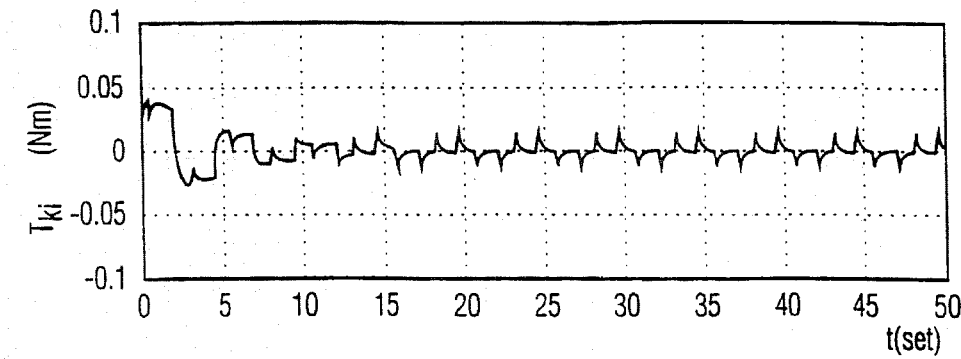

FIG. 6 shows a part of another controller according to the invention, comprising a control unit 4, a mechanical system 2 and compensation means 5. The mechanical system 2 represents a rotating mass with an inertia J which is rotated in $\phi$-direction, whereby a Coulomb-torque $T_f$ opposes the rotation of the mass. The system 2 is denoted in the Laplace-transform. The control unit 4 comprises a proportional action $k_p$ acting on a difference $\phi_{set}-\phi$, between an position setpoint signal $\phi_{set}$ and a position output signal $\phi$. The control unit 4 further comprises a differentiating action $H_{vel}k_v$ acting only on the position $\phi$, whereby $H_{vel}$ represents a transfer function of a differentiating network 22 according to FIG. 4, which is used to estimate the velocity $\dot{\phi}_{est}$ of the mass of the mechanical system 2. The transfer function is $$H_{vel} = \frac{\dot{\phi}_{est}}{\phi} = s \frac{K_2}{s^2 + K_1 s + K_2}.$$

The compensation means 5 also comprises the transfer function $H_{vel}$ for estimating the velocity $\dot{\phi}_{est}$. The compensation means 5 further comprises a model 10 of the non-linear mechanical part of the mechanical system 2. The model 10 represents a Coulomb-friction whereby, the friction compensation torque $T_c = c_1$ if $\dot{\phi}_{est} > \epsilon$ and $T_c = -c_2$ if $\dot{\phi}_{est} < -\epsilon$. If the velocity $|\dot{\phi}_{est}| \leq \epsilon$ no compensation is applied. The torque $T_c$ is added to a torque $T_s$ of the control unit 4.

FIG. 7 shows another controller 1 according to the invention with the control unit 4, the mechanical system 2 and the compensation means 5 of FIG. 6. The compensation means 5 of FIG. 6 are integrated with adaptation means of the controller 1 in one unit 11. The controller 1 further comprises a reference model 7 comprising a model of both the control unit 4 and the linearized part $$\left(\frac{1}{Js^2}\right)$$

of the mechanical system 2. The position output signal $\phi_m$ of the reference model 7 would be the same as the position output signal $\phi$ of the mechanical system 2 if no friction $T_f$ would occur in the mechanical system 2. With the unit 11 a residual torque $T_r$ is calculated based on a difference between the position $\phi$ of the mechanical system 2 and the position $\phi_m$ of the reference model 7 according to:

$$T_r = T_f - T_c = JH_{acc}(\phi_m - \phi) + k_v H_{vel}(\phi_m - \phi) + k_p(\phi_m - \phi).$$

$H_{acc}$ represents a transfer function of a differentiating network 22, which is used to estimate the acceleration $\ddot{\phi}_{est}$, whereby $$H_{acc} = \frac{\ddot{\phi}_{est}}{\phi} = s^2 \frac{K_2}{s^2 + K_1 s + K_2}.$$

FIG. 8 shows a PID-control unit 12 of a controller 1 according to the invention, which can be used instead of the control unit 4 of FIG. 6 in the controller 1 of FIG. 7. The control unit 12 comprises a proportional (P) action $k_p$ acting on the difference of $\phi_{set}-\phi$, an integrating (I) action $$\frac{k_i}{s},$$

whereby $k_i$ is an integral control parameter, and a differentiating (D) action $H_{vel}k_v$ acting only on the position $\phi$, whereby $H_{vel}$ represents a transfer function of a differentiating network 22, which is used to estimate the velocity $\dot{\phi}_{est}$ of the mass of the mechanical system 2. Due to the integral action an additional torque $T_{ki}$ is applied to the mechanical system 2. If the reference model 7 of FIG. 7 remains the same, the remaining torque $T_r$ will be:

$$T_r = T_f - T_c = JH_{acc}(\phi_m - \phi) + k_v H_{vel}(\phi_m - \phi) + k_p(\phi_m - \phi) + T_{Id}$$

With a PD-control unit, no adaptation of the compensation takes place if the velocity $|\dot{\phi}_{est}| \leq \epsilon$. Because of this a position error e will remain if the friction $T_f$ is not yet entirely compensated. Although the position error e might be small, it can exceed a desired high accuracy. Due to the integral action the position of the mechanical system 2 will always reach the desired accuracy.

The FIGS. 9a–d, 11a–b, 12a–b and 13 show results of computer simulations with a controller 1 according to the invention, whilst FIGS. 15a–f show results of experiments with a controller 1 according to the invention on a mechanical system 14 as shown in FIG. 14. By the computer simulations it is assumed that $d_1 = d_2 = d$, that $c_1 = c_2 = c$ and that the adaptation of the compensation value c and the compensation torque $T_c$ works as follows:

$$\text{if } |\dot{\phi}_{est}| > 0 \text{ then } c = \int_{t_0}^{t} \tau T_r dt + c(t_0) \text{ and } T_c = c$$

$$\text{if } \dot{\phi}_{est} = 0 \text{ then } c \text{ is not changed and } T_c = 0$$

For the computer simulations no dead zone $\epsilon$ is needed around $$\dot{\phi}_{est} = 0, \text{ so } \epsilon = 0.$$

The FIGS. 9a–d show results of a computer simulation with the controller 1 comprising the elements as shown in the FIGS. 6 and 7, whereby $\tau = 0,2/s$.

FIG. 9a shows the results of a simulation, whereby the compensation and adaptation unit 11 is disabled. Due to the friction a static position error e of 0,05 (rad) will remain. The static position error is the position error of the mechanical system when it is not moving, $\phi$ is constant or $\dot{\phi}_{est} = 0$.

FIG. 9b shows the results of a simulation with adaptive compensation, whereby at the beginning of the simulation the compensation value c=0. At the beginning of the simulation is the remaining torque $T_r = 0,05$ Nm. Since there is no compensation at the beginning, the remaining torque $T_r$ is equal to the friction $T_f$, $T_f = T_r = 0,05$ Nm. At the end of the simulation the remaining torque $T_r = 0$ and the compensation value c=0,05 Nm equals the friction $T_f$. The static position error decreases in time to zero. As can be seen by the horizontal lines in the graphic of the compensation value c, no adaptation of the compensation takes place if the velocity is zero (if $\phi_{set}$ is constant).

FIG. 9c shows the results of a simulation with a compensation value c=2 d=0,1 Nm but without adaptation of the compensation. The remaining torque $T_r$ is only depicted for information and varies around d−c=0,05−0, 1=−0,05 Nm. The position error shows limit cycling due to the over-compensation of the friction.

FIG. 9d shows the results of a simulation with adaptive compensation, whereby at the beginning of the simulation the compensation value c=2d=0,1 Nm. At the beginning of the simulation the remaining torque $T_r$=d−c=−0,05 Nm. Since there is over-compensation at the beginning, the position error e and the remaining torque $T_r$ oscillate. Due to the oscillation there is no zero velocity and the compensation value c decreases continuously until it equals the friction d=0,05 Nm. At the end of the simulation the remaining torque $T_r$=0. The static position error e decreases in time to zero.

The simulations of the FIGS. 9a−d show that the adaptation technique works correctly. Starting without friction compensation the compensation value c increases until it is equal to the friction d. Starting with over-compensation the compensation value c decreases until it is equal to the friction d. In both cases the mechanical system behaves ultimately like a mechanical system without friction.

FIG. 10 shows a simplified model of a mechanical system 13, which can be described as a fourth order system. The mechanical system 13 comprises two inertias $J_1$, $J_2$, whereby $J_2$ is much smaller than $J_1$, and a stiffness $K_1$ between the inertias $J_1$,$J_2$. The controller 1 of FIG. 7 is used, with the control unit 4 of FIG. 6 and whereby the mechanical system 2 is replaced by the mechanical system 13. The position $\phi_1$ is used in the controller 1. Further it is assumed that friction only acts on the first inertia $J_1$. The reference model 7 is not adapted, for the value of the inertia J, $J_1+J_2$ is taken.

The FIGS. 11a−b show the results of a simulation with the mechanical system 13.

FIG. 1a shows results of a simulation with adaptive compensation, similar to the simulation of FIG. 9b, whereby at the beginning of the simulation the compensation value c=0. At the beginning of the simulation the remaining torque $T_r$=0,05 Nm is equal to the friction $T_f$, $T_f$=$T_r$=0,05 Nm. At the end of the simulation the remaining torque $T_r$=0 and the compensation torque c=0,05 Nm is equal to the friction $T_f$. The static position error decreases in time to zero. As can be seen by the horizontal lines in the graphic of the compensation value c, no adaptation of the compensation takes place if the velocity is zero (if $\phi_{set}$ is constant).

FIG. 11b shows the results of a simulation with adaptive compensation, similar to the simulation of FIG. 9d, whereby at the beginning of the simulation the compensation value c=2d=0,1 Nm. At the beginning of the simulation the remaining torque $T_r$=d−c=−0,05 Nm. Due to the over-compensation at the beginning, the position error e and the remaining torque $T_r$ oscillate. Due to the oscillation there is no zero velocity and the compensation value c decreases continuously until it equals the friction d=0,05 Nm. At the end of the simulation the remaining torque $T_r$=0. The static position error e decreases in time to zero.

The FIGS. 12a−b show results of a computer simulation with the controller 1 comprising the elements as shown in the FIGS. 6 and 7, whereby τ=0,2/s. However, by calculating the remaining torque $T_r$ the acceleration terms are neglected so that $T_r=T_f-T_c=k_vH_{vel}(\phi_m-\phi)+k_p(\phi_m-\phi)$.

FIG. 12a shows the results of a simulation with adaptive compensation, whereby at the beginning of the simulation the compensation value c=0. At the beginning of the simulation the remaining torque $T_r$=0,05 Nm is equal to the friction $T_f$, $T_f$=$T_r$=0,05 Nm. At the end of the simulation the remaining torque $T_r$=0 and the compensation value c=0,05 Nm is equal to the friction $T_f$. The static position error decreases in time to zero. As can be seen by the horizontal lines in the graphic of the compensation value c, no adaptation of the compensation takes place if the velocity is zero (if $\phi_{set}$ is constant).

FIG. 12b shows the results of a simulation with adaptive compensation, whereby at the beginning of the simulation the compensation value c=2d=0,1 Nm. At the beginning of the simulation the remaining torque $T_r$=d−c=−0,05 Nm. Due to the over-compensation at the beginning, the position error e and the remaining torque $T_r$ oscillate. Due to the oscillation there is no zero velocity and the compensation value c decreases continuously until it equals the friction d=0,05 Nm. At the end of the simulation the remaining torque $T_r$=0. The static position error e decreases in time to zero.

From the FIGS. 12a−b it can be noted that adaptive compensation without the acceleration terms gives the same results as the adaptive compensation including the acceleration terms. This can be explained as follows. At high acceleration of the mechanical system 2 the friction d is relatively small compared to the torque $T_s$ necessary to achieve the acceleration. So the difference between the acceleration of the reference model 7 and the mechanical system is also relatively small. At low acceleration, the influence of the friction is of importance. But since the acceleration is small, the acceleration term of $T_r$ will be small too.

FIG. 13 shows a computer simulation with adaptive compensation with a controller 1 comprising the mechanical system 2 of FIG. 6, the reference model 7 and the compensation and adaptation unit 11 of FIG. 7, and the control unit 12 of FIG. 8, whereby τ=0,2/s.

At the beginning of the simulation the compensation value c=0 and the position error due to the friction is nullified by the integral torque $T_{ki}$. The static position error is almost zero from the beginning. At the end of the simulation the friction $T_f$ is compensated by the compensation value c and the integral torque $T_{ki}$ is used to guarantee the desired position accuracy in a short time. The compensation value c is used to permanently compensate the friction $T_f$ whilst the integral torque $T_{ki}$ is used to reduce the static position error.

FIG. 14 shows a mechanical system 14, which has been used for experiments with the controller 1 according to the invention. The mechanical system 14 comprises a slide 15 which is connected to a ball nut 16. The ball nut 16 is movable along a spindle 17 which is driven by a motor 18 via a gearwheel transmission, comprising two gearwheels 19a,b. The angular position ϕ of the motor 18 is measured with an encoder 20. The spindle 17 is carried by two bearings 21. By multiplication of the angular position ϕ of the motor 18 with the transmission ratios of the gearwheels 19a,b and the spindle 17, the position x of the slide 15 is obtained. A model of the mechanical system 14 is shown in FIG. 10. For controlling the angular position ϕ of the motor 18 a controller 1 according to the invention is used, comprising the control unit 4 of FIG. 8. For the reference model 7 the fourth order system of FIG. 10 is simplified to a second order system as shown in FIG. 7. Furthermore, the reference model 7 only comprises the proportional and differentiating actions but not the integral action of the control unit 4. If the mechanical system 14 is not moving, the velocity $\dot\phi_{est}$ should be equal to zero. Due to noise, however, the velocity detection can be distorted. Therefore, it is implemented in the controller 1 that the absolute value of the velocity has to exceed a certain value $\epsilon$ before movement is detected. The compensation of the compensation means and adaptation unit 11 of the controller 1 works as follows:

$$\text{if } \dot\phi_{est} > \epsilon \text{ then } c_1 = \int_{t_0}^{t} \tau T_r dt + c_1(t_0) \text{ and } T_c = c_1$$

$$\text{if } |\dot\phi_{est}| \leq \epsilon \text{ then } T_c = 0$$

$$\text{if } \dot\phi_{est} < -\epsilon \text{ then } c_2 = \int_{t_0}^{t} -\tau T_r dt + c_2(t_0) \text{ and } T_c = -c_2$$

whereby $$T_r = T_f - T_c = JH_{acc}(\phi_m - \phi) + k_v H_{vel}(\phi_m - \phi) + k_p(\phi_m - \phi) + T_{ki}.$$

The mechanical system 14 are subject to friction between all the moving parts.

The FIGS. 15a–f show the results of different experiments with a controller 1 comprising the mechanical system 14 of FIG. 14, the reference model 7 and the compensation and adaptation unit 11 of FIG. 7 with the above mentioned adaptation rules, and the control unit 12 of FIG. 8. The desired position accuracy is $\alpha=0,004$ rad, depicted by dashed lines in the figures.

FIG. 15a shows the result of an experiment, whereby the compensation and adaptation unit 11 and the integral action of the control unit 4 are disabled.

Due to the friction a static position error remains which exceeds the desired accuracy $\alpha$. Although the friction is not compensated for, the remaining torque $T_r$ is depicted to give an indication of the detected friction. The friction is not constant but depends on the position $\phi_{est}$.

FIG. 15b shows the result of an experiment, whereby the compensation and adaptation unit 11 is enabled, whilst the integral action of the control unit 4 is disabled.

In the beginning of the experiment the compensation values $c_1=c_2=0$ Nm and the adaptation factor $\tau=0,5$/s.

The system behaves as expected. At the end of the experiment, the compensation values $c_1$, $c_2$ are increased, the static position error and the remaining torque $T_r$ are decreased. At the end some unexplainable limit cycling occurs, However, the static position error is nearly the same as the desired position accuracy $\alpha$.

FIG. 15c shows the result of an experiment, whereby the compensation means are enabled, whilst the adaptation means ($\tau=0$) and the integral action of the control unit 4 are disabled.

During the experiment the compensation values $c_1=c_2=0,1$ Nm, a value whereby over-compensation is expected.

Due to the over-compensation limit cycling occurs which can be seen by the oscillating values of the position error $\epsilon$ and the remaining torque $T_r$.

FIG. 15d shows the result of an experiment, whereby the compensation and adaptation means are enabled, whilst the integral action of the control unit 4 is disabled.

In the beginning of the experiment the compensation values $c_1=c_2=0,1$ Nm, a value whereby over-compensation is expected and the adaptation factor $\tau=0,5$/s. The setpoint signal $\phi_{set}=0$ (rad). At t=0 (see) a distortion is applied to the system. Subsequently limit cycling occurs around $\epsilon=0$. The adaptation means work as expected and the over-compensation is nullified, limit cycling no longer occurs and the position error is decreased to a value smaller than the desired accuracy $\alpha$.

FIG. 15e shows the result of an experiment, whereby the compensation and adaptation means are enabled, whilst the integral action of the control unit 4 is disabled.

By calculating the remaining torque $T_r$ the acceleration terms are neglected, so that the remaining torque $T_r=T_f-T_c= k_v H_{vel}(\phi_m-\phi)+k_p(\phi_m-\phi)$. In the beginning of the experiment the compensation values $c_1=c_2=0$ Nm and the adaptation factor $\tau=0,5$/s. Although the acceleration terms are neglected, the results show good similarity with the results of FIG. 15b.

FIG. 15f shows the result of an experiment, whereby the compensation and adaptation means and the integral action of the control unit 4 are enabled.

However other adaptation rules are applied, whereby the compensation for velocities $\dot\phi_{est}$ smaller than $\epsilon$ depends on whether the position error e exceeds the desired accuracy $\alpha$ according to:

$$\text{if } \dot\phi_{est} > \epsilon \text{ then } c_1 = \int_{t_0}^{t} \tau T_r dt + c_1(t_0) \text{ and } T_c = c_1$$

$$\text{if } \dot\phi_{est} < -\epsilon \text{ then } c_2 = \int_{t_0}^{t} -\tau T_r dt + c_2(t_0) \text{ and } T_c = -c_2$$

if $|\dot\phi_{est}| \leq \epsilon$ and $e > \alpha$ then $T_c = c_1$ if $|\dot\phi_{est}| \leq \epsilon$ and $e < -\alpha$ then $T_c = -c_c$ if $|\dot\phi_{est}| \leq \epsilon$ and $|e| \leq \alpha$ then $T_c$ remains the same whereby:

$$T_r = T_f - T_c = JH_{acc}(\phi_m - \phi) + k_v H_{vel}(\phi_m - \phi) + k_p(\phi_m - \phi) + T_{ki}.$$

The static position error is reduced smoothly within the desired accuracy $\alpha$. This happens very fast and without any problems. The position error is nullified without overshoot.

Instead of using an estimation of the velocity is it is also possible to use a resolver for measuring directly the velocity on the mechanical system.

I claim:

1. A controller for controlling a non-linear mechanical system having a plurality of degrees of freedom in accordance with a setpoint signal representing a desired position of the mechanical system with respect to at least one of said plurality of degrees of freedom, the mechanical system being representable as a combination of a linear part and a non-linear part and producing an output signal representing a current position of the mechanical system with respect to said at least one degree of freedom, the controller comprising:

a subtracter for subtracting the output signal of the mechanical system from the setpoint signal to produce an error signal;

a control unit for receiving the error signal and producing a control signal;

compensation means to compensate the non-linear behavior of the mechanical system, the compensation means producing an output signal;

an adder for adding the output signal of the compensation means to the control signal to produce an input signal to the mechanical system;

a reference model of the control unit in series with the linear part of the mechanical system, the reference model receiving the setpoint signal as an input signal and producing an output signal; and adaptation means for adapting the compensation means in dependence on a difference between the output signal of the mechanical system and the output signal of the reference model.

2. The controller according to claim 1, in which the control unit comprises proportional and derivative feedback.

3. The controller according to claim 2 in which the control unit comprises integral feedback.

4. A controller for controlling a non-linear mechanical system having a plurality of degrees of freedom in accordance with a setpoint signal representing a desired position of the mechanical system with respect to at least one of said plurality of degrees of freedom, the mechanical system being representable as a combination of a linear part and a non-linear part and producing an output signal representing a current position of the mechanical system with respect to said at least one degree of freedom, the controller comprising:

a subtracter for subtracting the output signal of the mechanical system from the setpoint signal to produce an error signal;

a control unit for receiving the error signal and producing a control signal;

compensation means to compensate the non-linear behavior of the mechanical system, the compensation means producing an output signal;

an adder for adding the output signal of the compensation means to the control signal to produce an input signal to the mechanical system;

a reference model of the control unit in series with the linear part of the mechanical system, the reference model receiving the setpoint signal as an input signal and producing an output signal; and adaptation means for adapting the compensation means in dependence on a difference between the output signal of the mechanical system and the output signal of the reference model, the non-linear behaviour of the mechanical system being due to Coulomb-friction which is compensated for by the compensation means, whereby the output signal of the compensation means represents a compensation force $F_c$, which depends on the direction of a velocity $V$ of the mechanical system according to:

if $V < -\epsilon$ then $F_c = -C_2$ if $|V| \leq \epsilon$ then $-C_2 \leq F_c \leq C_1$ if $V > \epsilon$ then $F_c = C_1$ whereby $\epsilon$ is a velocity below which accurate determination of the direction of the velocity is not possible, $C_1$, $C_2$ are compensation values, and the compensation force $F_c$ is added to a force output signal $F_s$ of the control unit.

5. The controller according to claim 4, in which the adaptation means adapts the compensation values $c_1$, $c_2$ by calculating a remaining force $F_r$, which depends on a difference between a position output signal of the mechanical system and a position output signal of the reference model, after which new values for $c_1$ and $c_2$ are calculated according to $$\text{if } V > \epsilon \text{ then } c_1 = \int_{t_0}^{t} \tau F_r dt + c_1(t_0),$$

$c_2$ is not changed and $F_c = c_1$ if $V < -\epsilon$ then $c_1$ is not changed, $$c_2 = \int_{t_0}^{t} -\tau F_r dt + c_2(t_0) \text{ and } F_c = -c_2$$

if $|V| \leq \epsilon$ and $e > \alpha$ then $c_1$ and $c_2$ are not changed and $F_c = c_1$ if $|V| \leq \epsilon$ and $e < -\alpha$ then $c_1$ and $c_2$ are not changed and $F_c = -c_2$ if $|V| \leq \epsilon$ and $|e| \leq \alpha$ then $c_1$, $c_2$ and $F_c$ are not changed with:

$t_0$: the moment at which the velocity changes its direction $\tau$: adaptation factor $e$: difference between a position setpoint signal and the position output signal of the mechanical system $\alpha$: desired accuracy.

6. The controller according to claim 5, in which acceleration terms in the remaining force $F_r$ are neglected by the adaptation means.

7. The controller according to claim 4, in which the adaptation means adapts the compensation values $c_1$, $c_2$ by calculating a remaining force $F_r$, which depends on a difference between a position output signal of the mechanical system and a position output signal of the reference model, after which new values for $c_1$ and $c_2$ are calculated according to $$\text{if } V > \epsilon \text{ then } c_1 = \int_{t_0}^{t} \tau F_r dt + c_1(t_0),$$

$c_2$ is not changed and $F_c = c_1$ if $|V| \leq \epsilon$ then $c_1$ and $c_2$ are not changed and $F_c = 0$ if $V < -\epsilon$ then $c_1$ is not changed, $$c_2 = \int_{t_0}^{t} -\tau F_r dt + c_2(t_0) \text{ and } F_c = -c_2$$

with $t_0$: the moment at which the velocity changes its direction $\tau$: adaptation factor.

* * * * *